US010785696B2

(12) United States Patent
Li et al.

(10) Patent No.: US 10,785,696 B2
(45) Date of Patent: Sep. 22, 2020

(54) SYSTEMS AND METHODS FOR USER PLANE PATH SELECTION, RESELECTION, AND NOTIFICATION OF USER PLANE CHANGES

(71) Applicants: Xu Li, Nepean (CA); Ngoc Dung Dao, Ottawa (CA); Jaya Rao, Ottawa (CA)

(72) Inventors: Xu Li, Nepean (CA); Ngoc Dung Dao, Ottawa (CA); Jaya Rao, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/627,015

(22) Filed: Jun. 19, 2017

(65) Prior Publication Data
US 2017/0366399 A1 Dec. 21, 2017

Related U.S. Application Data

(60) Provisional application No. 62/352,857, filed on Jun. 21, 2016, provisional application No. 62/356,993, (Continued)

(51) Int. Cl.
*H04W 40/02* (2009.01)
*H04W 12/08* (2009.01)
(Continued)

(52) U.S. Cl.
CPC ......... *H04W 40/02* (2013.01); *H04L 41/0816* (2013.01); *H04L 45/02* (2013.01);
(Continued)

(58) Field of Classification Search
CPC ............... H04W 40/34; H04L 41/0816; H04L 43/0811; H04L 12/4604; H04L 41/048
See application file for complete search history.

(56) References Cited

U.S. PATENT DOCUMENTS

2003/0101246 A1   5/2003  Lahti
2008/0153443 A1*  6/2008  Takusagawa ..... H04W 36/0011
                                                        455/187.1
(Continued)

FOREIGN PATENT DOCUMENTS

CN   102158897 A    8/2011
CN   102763392 A   10/2012
(Continued)

OTHER PUBLICATIONS

3GPP TR 23.708 V13.0.0 (Jun. 2015), 3rd Generation Partnership Project; Technical Specification Group Services and System Aspects; Architecture Enhanvements for Service Capability Exposure (Release 13).*
(Continued)

*Primary Examiner* — Andrew Lai
*Assistant Examiner* — Harry H Kim

(57) ABSTRACT

Systems and methods for performing User Plane (UP) path selection or reselection over a communications network with a $3^{rd}$ party entity, and for notifying network entities of UP changes in a communications network, are disclosed. The method includes: receiving an application program interface based request for UP path selection from the $3^{rd}$ party entity; performing a validation and authorization procedure with the request; transmitting a UP path selection configuration request to a Control Plane Function that maintains configuration data; obtaining a reference number confirming the UP path selection configuration request; and installing the UP path selection according to the reference number.

8 Claims, 30 Drawing Sheets

Related U.S. Application Data filed on Jun. 30, 2016, provisional application No. 62/375,198, filed on Aug. 15, 2016.

(51) Int. Cl.
*H04W 28/08* (2009.01)
*H04W 12/06* (2009.01)
*H04W 40/34* (2009.01)
*H04L 29/06* (2006.01)
*H04L 12/24* (2006.01)
*H04L 12/46* (2006.01)
*H04L 12/26* (2006.01)
*H04L 12/751* (2013.01)

(52) U.S. Cl.
CPC .......... *H04L 63/102* (2013.01); *H04W 12/06* (2013.01); *H04W 12/08* (2013.01); *H04W 28/08* (2013.01); *H04W 40/34* (2013.01); *H04L 12/4604* (2013.01); *H04L 41/048* (2013.01); *H04L 43/0811* (2013.01)

(56) References Cited

U.S. PATENT DOCUMENTS

| | | | |
|---|---|---|---|
| 2010/0208704 A1* | 8/2010 | Wu | H04W 36/14 370/331 |
| 2011/0141946 A1* | 6/2011 | Ostrup | H04L 67/145 370/254 |
| 2011/0202647 A1 | 8/2011 | Jin et al. | |
| 2012/0155377 A1* | 6/2012 | Chai | H04W 36/0085 370/315 |
| 2013/0073508 A1 | 3/2013 | Zhou et al. | |
| 2013/0322365 A1 | 12/2013 | Garcia Martin et al. | |
| 2014/0179310 A1* | 6/2014 | Liang | H04W 48/18 455/433 |
| 2014/0256283 A1 | 9/2014 | Lin et al. | |
| 2015/0078295 A1 | 3/2015 | Mandyam et al. | |
| 2015/0103772 A1 | 4/2015 | Carnero Ros et al. | |
| 2015/0341837 A1 | 11/2015 | Zhao et al. | |
| 2015/0351138 A1 | 12/2015 | Metsala et al. | |
| 2016/0112896 A1 | 4/2016 | Karampatsis et al. | |
| 2016/0135010 A1 | 5/2016 | Zhu | |
| 2016/0174198 A1 | 6/2016 | Akiyoshi et al. | |
| 2016/0212678 A1 | 7/2016 | Akiyoshi | |
| 2016/0270132 A1 | 9/2016 | Patil et al. | |
| 2016/0277243 A1* | 9/2016 | Kim | H04L 41/0816 |
| 2017/0242730 A1 | 8/2017 | Wang et al. | |
| 2017/0289882 A1* | 10/2017 | Faccin | H04W 76/10 |
| 2017/0317894 A1 | 11/2017 | Dao et al. | |
| 2017/0331691 A1 | 11/2017 | Zhou | |
| 2017/0339609 A1* | 11/2017 | Youn | H04W 76/11 |
| 2017/0366423 A1* | 12/2017 | Griot | H04L 43/0829 |
| 2018/0176979 A1 | 6/2018 | Ryu et al. | |
| 2018/0317121 A1 | 11/2018 | Liao et al. | |
| 2018/0376373 A1 | 12/2018 | Liao et al. | |
| 2019/0045408 A1* | 2/2019 | Kim | H04W 36/08 |
| 2019/0110330 A1 | 4/2019 | Wang et al. | |

FOREIGN PATENT DOCUMENTS

| | | |
|---|---|---|
| CN | 102811473 A | 12/2012 |
| CN | 103582044 A | 2/2014 |
| CN | 104348826 A | 2/2015 |
| CN | 104704905 A | 6/2015 |
| CN | 105393506 A | 3/2016 |
| CN | 106210042 A | 12/2016 |
| EP | 2884803 A1 | 8/2013 |
| EP | 3276990 A1 | 1/2018 |
| JP | 2005510802 A | 4/2005 |
| JP | 2015177385 A | 10/2015 |
| JP | 2017510209 A | 4/2017 |
| WO | 2014035418 A1 | 3/2014 |
| WO | 2014117370 A1 | 8/2014 |
| WO | 2015055063 A1 | 4/2015 |
| WO | 2015103875 A1 | 7/2015 |
| WO | 2015153589 A1 | 10/2015 |
| WO | 2016045708 A1 | 3/2016 |
| WO | 2016074138 A1 | 5/2016 |
| WO | 2016163723 A1 | 10/2016 |
| WO | 2018008980 A1 | 1/2018 |

OTHER PUBLICATIONS

3GPP TR 23.708, "Architecture Enhancements for Service Capability Exposure", 3GPP R13, V13.0.0 (Year: 2015).*
International Search Report dated Aug. 15, 2017 for corresponding International Application No. PCT/CN2017/089301 filed Jun. 21, 2017.
3rd Generation Partnership Project 3GPP TR 23.708 V13.0.0 Architecture enhancements for service capability exposure (Release 13) Technical Specification Group Services and System Aspects Jun. 30, 2015.
International Search Report dated Sep. 27, 2017 for corresponding International Application No. PCT/CN2017/089280 filed Jun. 21, 2017.
International Search Report dated Jan. 5, 2018 for corresponding International Application No. PCT/CN2017/104083 filed Sep. 28, 2017.
"Session Management for Scenarios with Branching Functions", 3GPP S2-164516 SA WG2 Meeting #117-BIS, Huawei, HiSilicon, Sep. 2, 2016.
"Session Management to Enable (Re-)selection of Efficient User plane path", 3GPP S2-162507 SA WG2 Meeting #115, Nokia, Alcatel-Shanghai Bell, Sprint, May 27, 2016.
"Session Management Support for URLLC in High Mobility Scenarios", 3GPP S2-163430 SA WG2 Meeting #116, Huawei, HiSilicon, Jul. 15, 2016.
3GPP TR 23.799: "Study on Architecture for Next Generation System," Feb. 2016.
3GPP TR 23.799: "Study on Architecture for Next Generation System," Apr. 2016.
3GPP TR 23.799: "Study on Architecture for Next Generation System," May 2016.
3GPP TR 22.891: "Feasibility Study on New Services and Markets Technology Enablers," Mar. 2016.
China Mobile: "Clarify the Key Issue on Network Capability Exposure", 3GPP Draft;S2-161340, Feb. 29, 2016, XP051086307, 3 pages.
3GPP TSG-RAN WG2 Meeting #96 R2-167661, "Status of NG study in SA2",Nokia, CMCC (Rapporteurs),Nov. 14-18, 2016.
3GPP TR 23.799 V2.0.0 (Nov. 2016);3rd Generation Partnership Project;Technical Specification Group Services and System Aspects;Study on Architecture for Next Generation System(Release 14).
3GPP TSG SA WG2 Meeting # S2-170370, "Application-friendly UP Management",Huawei, HiSilicon,2016.
"System Architecture for the 5G System; Stage 2;" 3GPP TS 23.501 V0.0.0 (Jan. 2017).
Procedures for the 5G System; Stage 2;3GPP TS 23.502 V0.0.0 (Jan. 2017).
"Study on Architecture for Next Generation System"; 3GPP TR 23.799 V14.0.0 (Dec. 2016).
Huawei et al., "Solution 4.X: On-demand SM setup",3GPP TSG SA WG2 Meeting #115 S2-162468,May 23-27, 2016, Nanjing, China,total 2 pages.
Huawei et al.,"TS 23.502: Procedures of enabling application-influenced UP management and SSC handling",3GPP TSG SA WG2 Meeting #120 S2-172006,Mar. 27-31, 2017, Busan, South Korea,Total 5 Pages.

* cited by examiner

SYSTEMS AND METHODS FOR USER PLANE PATH SELECTION, RESELECTION, AND NOTIFICATION OF USER PLANE CHANGES

CROSS-REFERENCE TO RELATED APPLICATIONS

This application claims the benefit of U.S. Provisional Application Ser. No. 62/352,857 titled "Systems and Methods for Network Capability Exposure" filed on Jun. 21, 2016, U.S. Provisional Application Ser. No. 62/356,993 titled "Systems and Methods for User Plane Path Selection, Reselection, and Notification of User Plane Changes" filed Jun. 30, 2016, and U.S. Provisional Application Ser. No. 62/375,198 titled "Systems and Methods for User Plane Path Selection, Reselection, and Notification of User Plane Changes" filed Aug. 15, 2016, each of which are incorporated by reference herein in their entirety.

FIELD OF THE INVENTION

The present invention pertains to the field of communication networks, and in particular towards systems and methods for user plane path selection, reselection, and notification of user plane changes.

BACKGROUND

The emergence of Network Capability Exposure (NCE) techniques have provided network management capabilities to $3^{rd}$ party entities, such as Internet Service Providers (ISPs) and Internet Content Providers (ICP). For example, an ISP can configure and manage a corresponding service performed over a communications network using an open Application Programming Interface (API), while a Network Operator can provide general management of network resources of the network. However, this arrangement requires a highly coordinated effort between the Network Operator and ISP.

Based on the $3^{rd}$ Generation Partnership Project (3GPP) Study on Service Exposure and Enablement Support (SEES) requirements, a Network Operator can provide network information to a $3^{rd}$ party entity, while maintaining specific control capability over the network. However, proposals for the $5^{th}$ Generation (5G) communications protocols lack mechanisms that can efficiently or effectively provide network control capabilities to $3^{rd}$ party entities.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method for user plane path selection and notification of user plane changes that may be carried out on in accordance with 5G communication network protocols.

According to embodiments, there is provided a method for notifying network functions of User Plane (UP) changes in a communications network. The method includes receiving, by a network capability exposure function (NCEF), a UP change notification information, the UP change notification request indicative of UP changes initiated by a $3^{rd}$ party entity. The method further includes transmitting, by the NCEF, a UP change notification configuration request to a control plane function that maintains configuration data, the UP change notification configuration request generated in accordance with the UP change notification information.

According to embodiments, there is provided a method for notifying network functions of User Plane (UP) changes in a communications network. The method includes receiving, by a policy control function (PCF), a UP change notification configuration request, the UP change notification configuration request indicative of UP changes initiated by a $3^{rd}$ party entity. The method further includes enforcing, by the PCF, a UP change notification indicative of the UP changes, wherein enforcing includes obtaining UP path selection policy details.

According to embodiments, there is provided a method for notifying network functions of User Plane (UP) changes in a communications network. The method includes enforcing, by a session management function (SMF), a UP change notification indicative of the UP changes, wherein enforcing includes obtaining UP change notification configuration details.

According to embodiments, there is provided a method for notifying network functions of User Plane (UP) changes in a communications network. The method includes applying, by a session management function (SMF), a UP change configuration and performing, by the SMF, UP path selection or reselection. The method further includes determining, by the SMF, UP changes required based on the UP path selection or reselection and transmitting, by the SMF, a UP change notification when UP changes are required.

According to embodiments, there is provided a method for notifying network functions of User Plane (UP) changes in a communications network. The method includes receiving, by a network capability exposure function (NCEF), a UP change notification indicative of UP changes and transmitting, by the NCEF, a notification indicating the UP changes.

According to embodiments, there is provided a method for notifying network functions of User Plane (UP) landmark changes in a communications network. The method includes applying, by the SMF, UP landmark changes required based on UP path selection or reselection. The method further includes transmitting, by the SMF, a UP landmark change notification when UP landmark changes are required.

According to some embodiments, the UP landmark is a data network access identifier.

According to embodiments, there is provided a network node for performing one or more of the above defined methods. The network node includes a processor and machine readable memory storing machine executable instructions. The machine executable instructions which when executed by the processor, configure the network node to perform the steps associated with the one or more above defined methods.

In accordance with embodiments of the present invention, there is provided a method for performing User Plane (UP) path selection over a communications network with a $3^{rd}$ party entity. The method comprises: receiving an application program interface based request for UP path selection from the $3^{rd}$ party entity; performing a validation and authorization procedure with the request; transmitting a UP path selection configuration request to a Control Plane Function that maintains configuration data; obtaining a reference number confirming the UP path selection configuration request; and installing the UP path selection according to the reference number.

In accordance with embodiments of the present invention, there is provided a method for notifying network elements of User Plane (UP) changes in a communications network. The method comprises: receiving a UP change notification request; performing a validation and authorization procedure with the request; transmitting a UP change notification request to a Control Plane Function that maintains configuration data; obtaining a reference number confirming the UP change notification; and enforcing the UP change notification according to the reference number.

In accordance with embodiments of the present invention, there is provided a method for notifying network elements of User Plane (UP) changes in a communications network. The method comprises: receiving a UP change request; performing UP path selection according to the UP change request; determining any UP changes according to changes in the UP path; transmitting a UP change notification to a Network Capability Exposure function; and receiving an acknowledgement of the UP change notification from an Application Function controller.

In accordance with embodiments of the present invention, there is provided a method for notifying network elements of User Plane (UP) changes in a communications network, the method including receiving a UP path change request and identifying a Protocol Data Unit (PDU) session impacted by the requested UP change and determining a Session and Service Continuity (SSC) mode as required. The method further includes performing UP path selection according to the UP path change request and transmitting a UP change notification to an Application System controller.

In accordance with embodiments of the present invention, there is provided a method for operating a UE in a communications network, the method comprising: transmitting a new session request to a network entity; receiving an indication of completion of a new session setup performed in response to the new session request; and using the new session setup for data transmission, wherein performing the new session setup comprises: notifying network elements of User Plane (UP) changes in the communications network; receiving a UP path change request corresponding to the new session request; identifying a Protocol Data Unit (PDU) session impacted by the requested UP path change; performing UP path selection according to the UP path change request; and transmitting a UP change notification to an Application System controller.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments of the present invention disclose a network information and capability exposure (NCE) framework, that may be applied for next generation communication systems (such as 5G) in the presence of network slicing. In some embodiments, network capabilities may be centralized/common to a core network, and/or shared/distributed between the core network and network slices (NS). In other embodiments, network capabilities may be selectively isolated, for example between network slices (i.e. specific to a NS). In some embodiments, the NCE framework may contain a common NCE function and a number of NS (slice specific) NCE functions (one per NS). This may provide a unified interface in a 3GPP network for use by a 3rd party or UE to discover, access, and customize the exposed network capabilities.

Figure 1A:
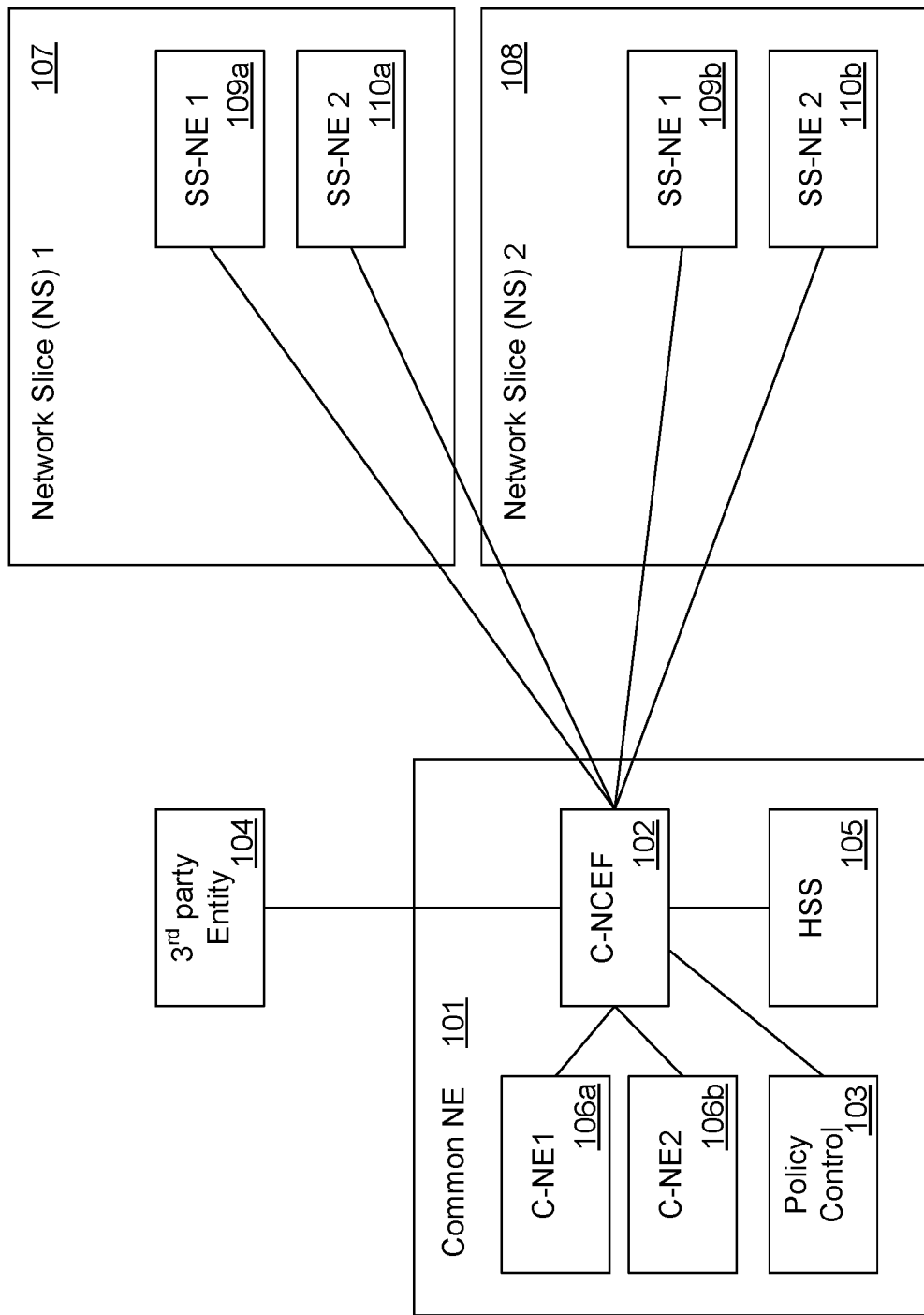
FIG. 1A is a functional schematic of a communications network, according to an embodiment.

FIG. 1A is a functional schematic of a communications network, according to an embodiment. The communications network comprises a Common Network Entity 101 (Common NE) which can be deployed on a core network, and includes a Common Network Capability Exposure Function (C-NCEF) 102 to interface with external functions/entities 104, a Policy Control Function 103 for performing authorization and related functionality, a Home Subscriber System (HSS) function 105 for performing authentication, security, and related functions, and various Common Network Entity functions, (C-NE1 106a, C-NE2 106b) for performing various network related tasks (for example, a Mobility Management Entity, a Slice Selection Entity, an Authentication Entity, a policy control entity, and so forth). According to embodiments, the PCF 103 is configured to generate or determine policy rules to be applied to the user equipment (UEs) or protocol data unit (PDU) sessions, according to parameters which can include one or more of subscription data, application profiles, service profiles, application requests or other parameters as would be readily understood. In a network capability exposure framework, the PCF may provide an authorization functionality as noted above, wherein this authorization functionality can include verifying a request against a policy of an operator network. A $3^{rd}$ Party Entity (for example, an application belonging to a $3^{rd}$ party running on the core network, a separate $3^{rd}$ party application system, or a UE) interfaces to the Common NCE through the NCEF. As would be readily understood, the core network, a separate $3^{rd}$ party application system, or a UE) can interface to the Common NE through the Common-NCEF Network Slices (NS1 107, NS2 108) may also be deployed on the core network, each further comprising respective Slice Specific Network Entity functions (55-NE1 109a, 110a, SS-NE2 109b, 110b) for performing various slice specific network related tasks (for example, a slice-specific, Session Management Entity, a slice-specific Policy Control Entity, a slice-specific Charging Entity, and so forth). As understood by those skilled in the art, a Network Slice is a collection of logical functions which manages a specific group of traffic and related signalling over a network, using Network Functions Virtualization technology. For example, each Slice may be allocated a portion of the network's resources (bandwidth, scheduling, access, use of nodes, etc.) and managed by a Mobile Network Operator (MNO) in order to serve requests (or provide services) of its end users (using wireless devices, user equipment, etc.) over the network. As shown in FIG. 1A, the slice specific Network Entity functions (55-NE1, SS-NE2) are logically interfaced/connected to the Common Network Capability Exposure Function (C-NCEF).

Accordingly, the communications network shown in FIG. 1A provides a common interface (through C-NCEF) resulting in centralized control over the network. Security and policy control functionality is shared between various entities, along with Operation, Administration, and Management (OAM) of Slices. The C-NCEF allows external entities to discover/access exposed network capabilities (i.e. network functions which may be externally managed or controlled), whether they are functions of the Common NE, or of a particular network slice. In some embodiments, this may also include authorized and secure access to 3GPP common system capabilities and execution of the exposed services under operator control.

Beneficially, the communications network architecture shown in FIG. 1A can provide a centralized interface, with centralized control. It may assume shared security (i.e. authentication) and policy control (i.e. authorization) while offering shared OAM. The single central NCEF can provide:

The capability for the external entities to discover the exposed network capabilities, whether common or NS-specific.

Authorised and secure access to 3GPP common system capabilities and execution of the exposed services under operator control, whether common or NS-specific.

According to embodiments, the policy control may provide an authorization functionality as noted above, wherein this authorization functionality can include validation or a request for example, verifying a request against a policy of an operator network.

Figure 1B:
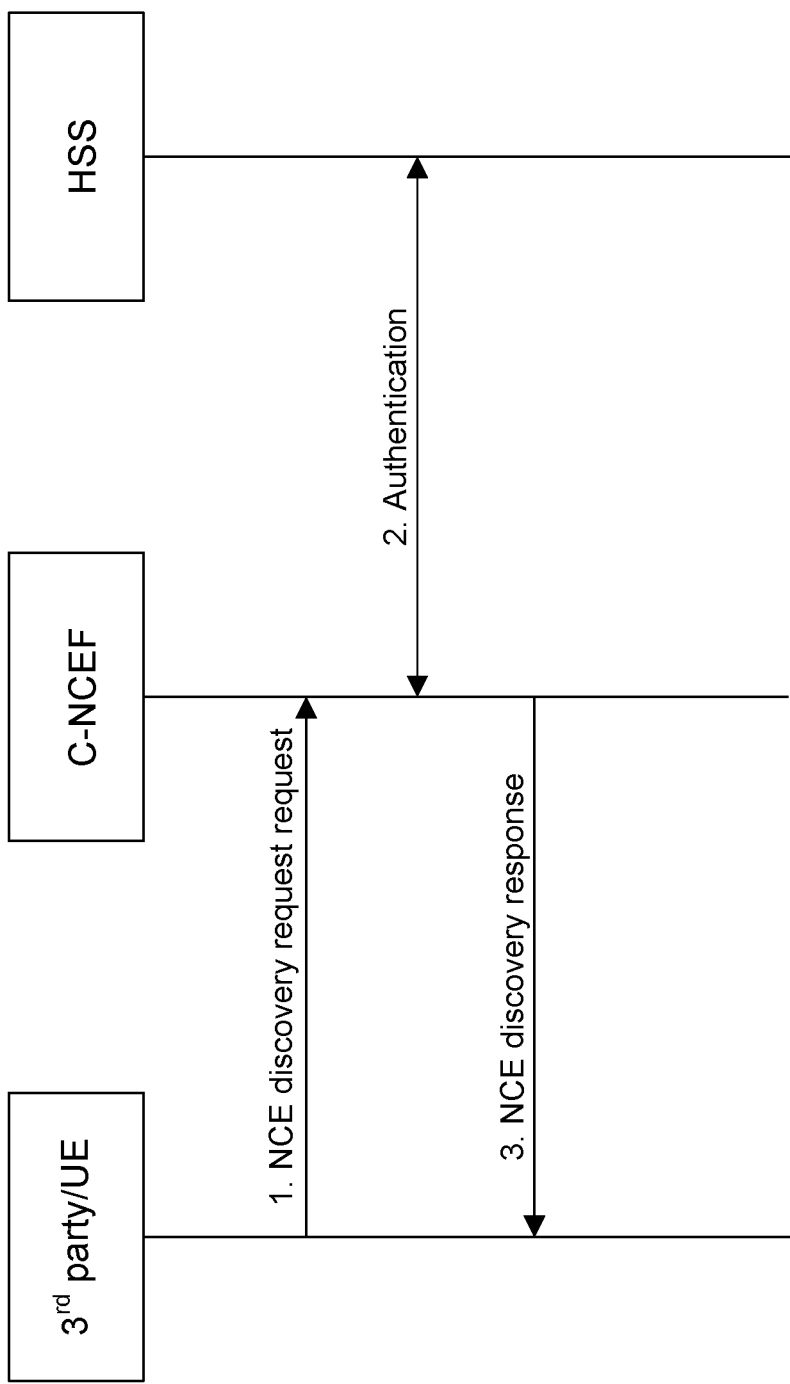
FIG. 1B is a call flow diagram illustrating a method for discovering exposed Network Capability Exposure (NCE) functions on a communications network, by a $3^{rd}$ party entity, according to an embodiment.

FIG. 1B is a call flow diagram illustrating a procedure for discovering exposed Network Capability Exposure (NCE) functions on a communications network, by a $3^{rd}$ party entity or UE, according to an embodiment. The method shown in FIG. 1B may be performed over the communications network shown in FIG. 1A, for example. In step 1, the $3^{rd}$ party/UE sends an NCE discovery request to the C-NCEF. The request may include the identity of the $3^{rd}$ party/UE, and may also include desired network capabilities whether relating to the common NE or NS-specific. In step 2, the C-NCEF function authenticates the $3^{rd}$ party via communication with the HSS function. In step 3, the C-NCEF function responds to the $3^{rd}$ party/UE, for example, with requested information, or exposure status of the exposed or desired network capabilities (i.e. those functions or capabilities that may be accessed by the $3^{rd}$ party/UE). In certain embodiments, the tasks of the C-NCEF in this method may be performed by another function in the Common NE, such as by the C-NE.

Figure 1C:
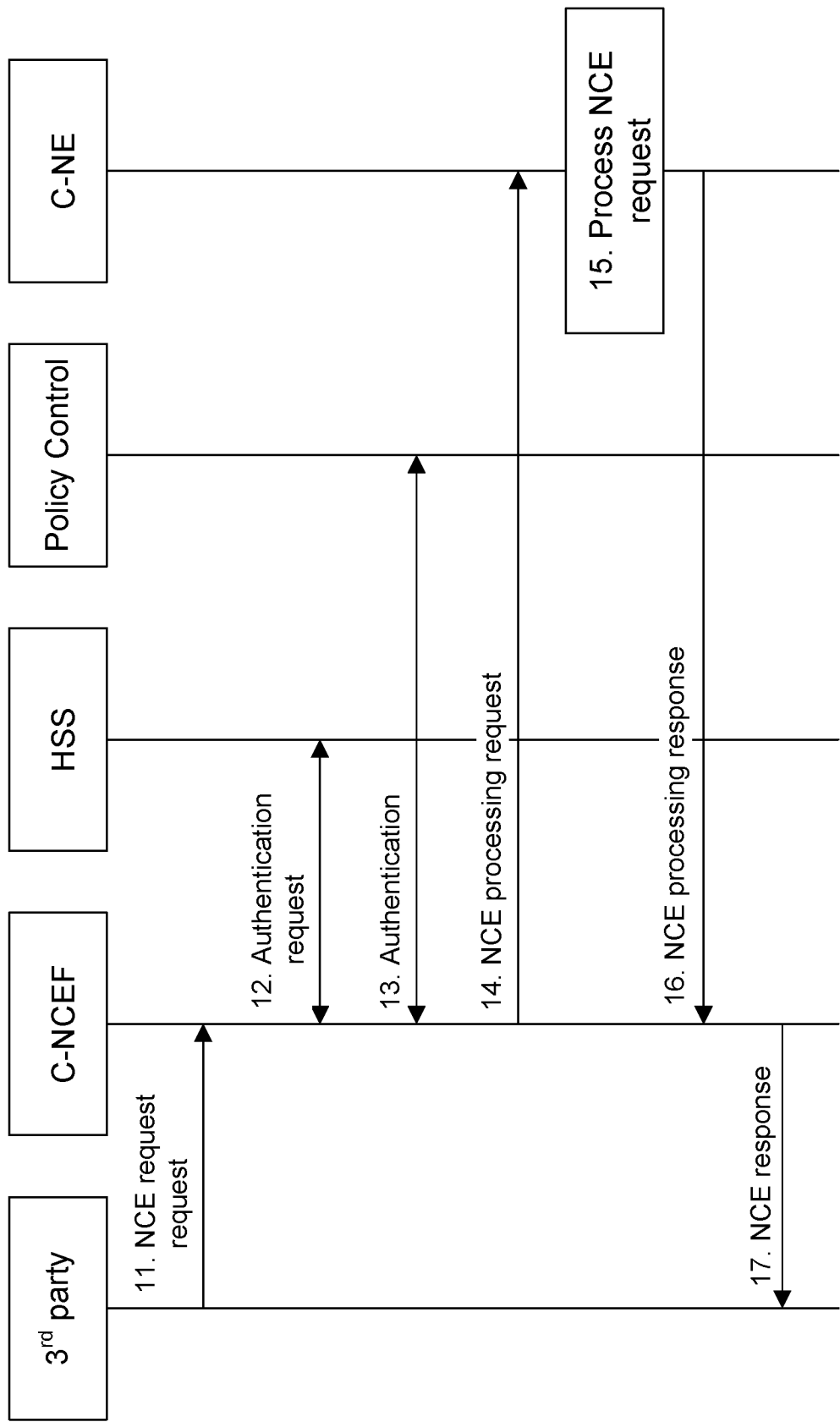
FIG. 1C is a call flow diagram illustrating a procedure for handling a NCE request on a communications network by a $3^{rd}$ party entity, according to an embodiment.

FIG. 1C is a call flow diagram illustrating a procedure for handling a Network Capability Exposure (NCE) request on a communications network, by a $3^{rd}$ party entity (or a UE), according to an embodiment. An NCE request may comprise for example request for installing UP path selection or reselection policy, request for end-to-end QoS policy, request for changing chargeable party, query for UE location, and query for UE connectivity status. Various other NCE requests are possible, depending on what network capabilities are exposed. The method shown in FIG. 1C may be performed over the communications network shown in FIG. 1A, for example. In step 11, the 3$^{rd}$ party sends a NCE request to the C-NCEF. The request can be a query, an instruction, or a desired configuration for certain network functions/capabilities. In step 12, the C-NCEF communicates with the HSS function to authenticate the 3$^{rd}$ party. In step 13, the NCEF communicates with the Policy Control function, which performs authorization according to an operator policy. Upon authorization, in step 14, the C-NCEF dispatches a NCE processing request an appropriate C-NE function (e.g. C-NE 1) according to the request. Prior to dispatching the request, the C-NCEF may in some embodiments, perform compilation by translating the received NCE request to an internal format that is understandable to the C-NE, and harmonizing it with an internal configuration. For example, the request may carry a related operator policy. In step 15, The C-NE function processes the NCE processing request, for example, by preparing a query answer or applying the instructed configuration, with respect to an operator policy. In step 16, the C-NE sends a NCE processing response as a query answer or a configuration acknowledgement to the C-NCEF. In step 17, the C-NCEF forwards an NCE response, which may comprise information embedded from the NCE processing response (step 16) to the 3$^{rd}$ party. Before forwarding, the C-NCEF may in some embodiments compile raw NCE information, for example, by translating it to a format that is understandable to the 3$^{rd}$ party, or applying filtering or aggregation rules to avoid information leakage according to operator policy. If there are multiple NCE processing responses from different NEs, it may also aggregate them into a single aggregate NCE response.

Figure 2A:
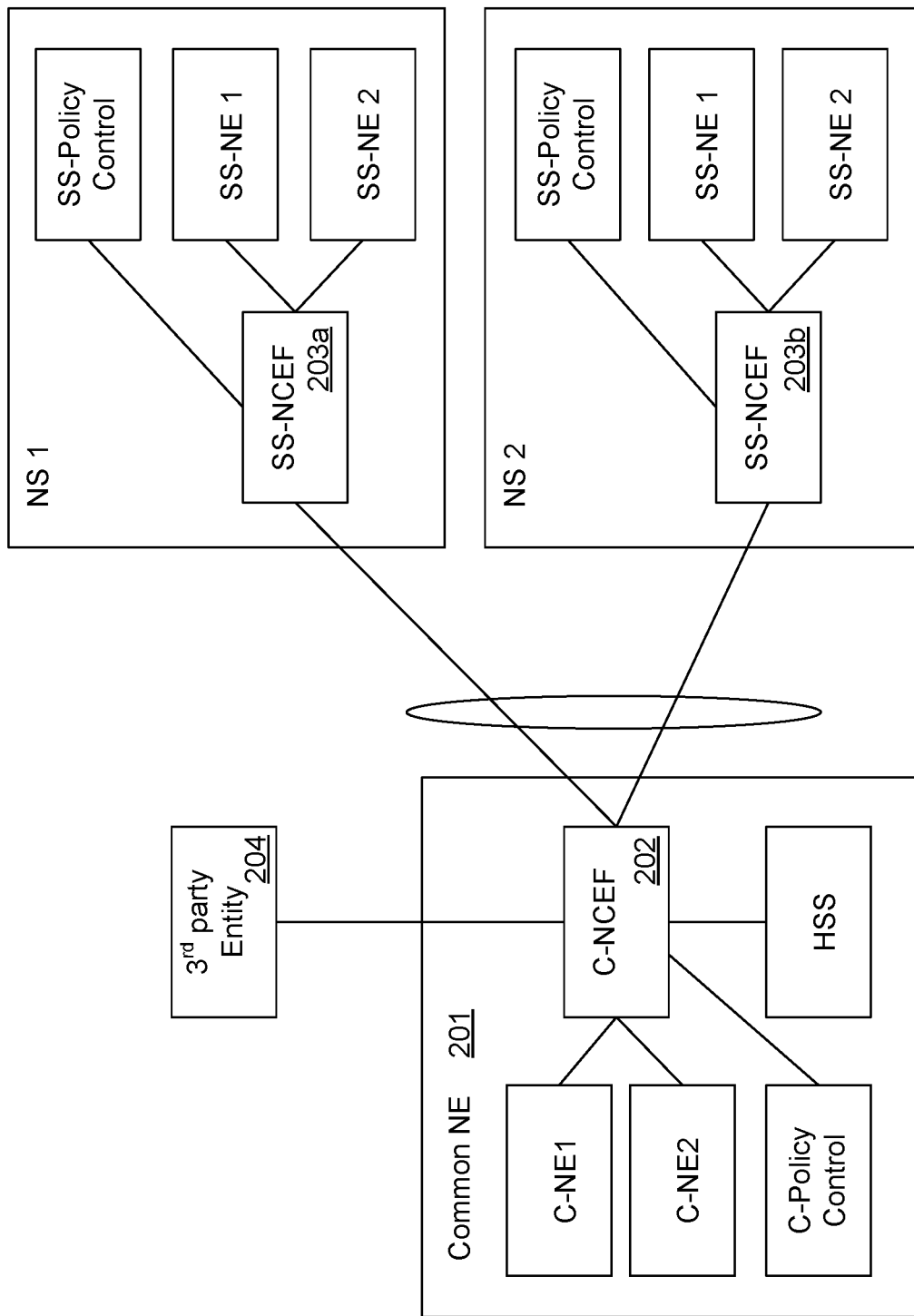
FIG. 2A is a functional schematic of a communications network, according to another embodiment.

FIG. 2A is a functional schematic of a communications network, according to another embodiment. The communications network shown in FIG. 2A is similar to that shown in FIG. 1A, except in that C-NCEF functions are dispersed amongst Slice Specific NCEF functions (SS-NCEF) in each Network Slice (NS1, NS2), which also comprises its own Slice Specific Policy Control functions. In this way, NCEF functionality that was centrally performed in the network of FIG. 1A is now distributed between the Common NE and different Network Slices.

The communications network in FIG. 2A can provide shared security functions (i.e. authentication), while maintaining isolated policy control (i.e. authorization) and offering quasi-isolated OAM. 3$^{rd}$ parities may interface with the C-NCEF (in Common NE) 201. In some embodiments, authentication may be performed by the C-NCEF 202, while authorization may be carried out by the SS NCEF 203*a*, 203*b* of the network slices, depending on whether the request relates to the common NE or a network slice. This may provide a more versatile configuration which can re-distribute or alleviate processing resources over the core network.

According to certain embodiments, C-NCEF functions may include: Classification of NCE requests from 3$^{rd}$ parties 204, and redirection of NS-specific requests to respective SS NCEFs, allowing external entities to discover the exposed common network capabilities/functions, provision of authorised and secure access to 3GPP common system capabilities, and execution of the exposed common services under operator control. SS NCEF functions may also include: allowing external entities to discover the exposed NS-specific capabilities over the network (the discovery may be performed via the common NCEF for example), provision of authorised and secure access to 3GPP NS-specific system capabilities, and execution of the exposed NS-specific services under operator control.

Beneficially, the communications network architecture shown in FIG. 2A can provide a semi-distributed configuration with a centralized interface, and distributed control. It may assume shared security (i.e. authentication) and isolated policy control (i.e. authorization), while offering a quasi-isolated OAM. In one embodiment, it contains a common NCEF and multiple NS-specific NCEFs (one per NS). 3$^{rd}$ party entities may interface with the common NCEF. Authentication may be performed by the common NCEF, while authorization may be carried out by the common NCEF or NS NCEF, depending on whether the request is concerned with common NCE or NS-specific NCE.

The common NCEF may provide:
Classification of NCE requests from a 3$^{rd}$ party entity, and redirection of NS-specific requests to respective NS NCEFs.
The capability for the external entities to discover the exposed common network capabilities.
Authorised and secure access to 3GPP common system capabilities and execution of the exposed common services under operator control.
The NS NCEF may provide:
The capability for the external entities to discover the exposed NS-specific network capabilities. The discovery is done via the common NCEF.
Authorised and secure access to 3GPP NS-specific system capabilities and execution of the exposed NS-specific services under operator control.

Figure 2B:
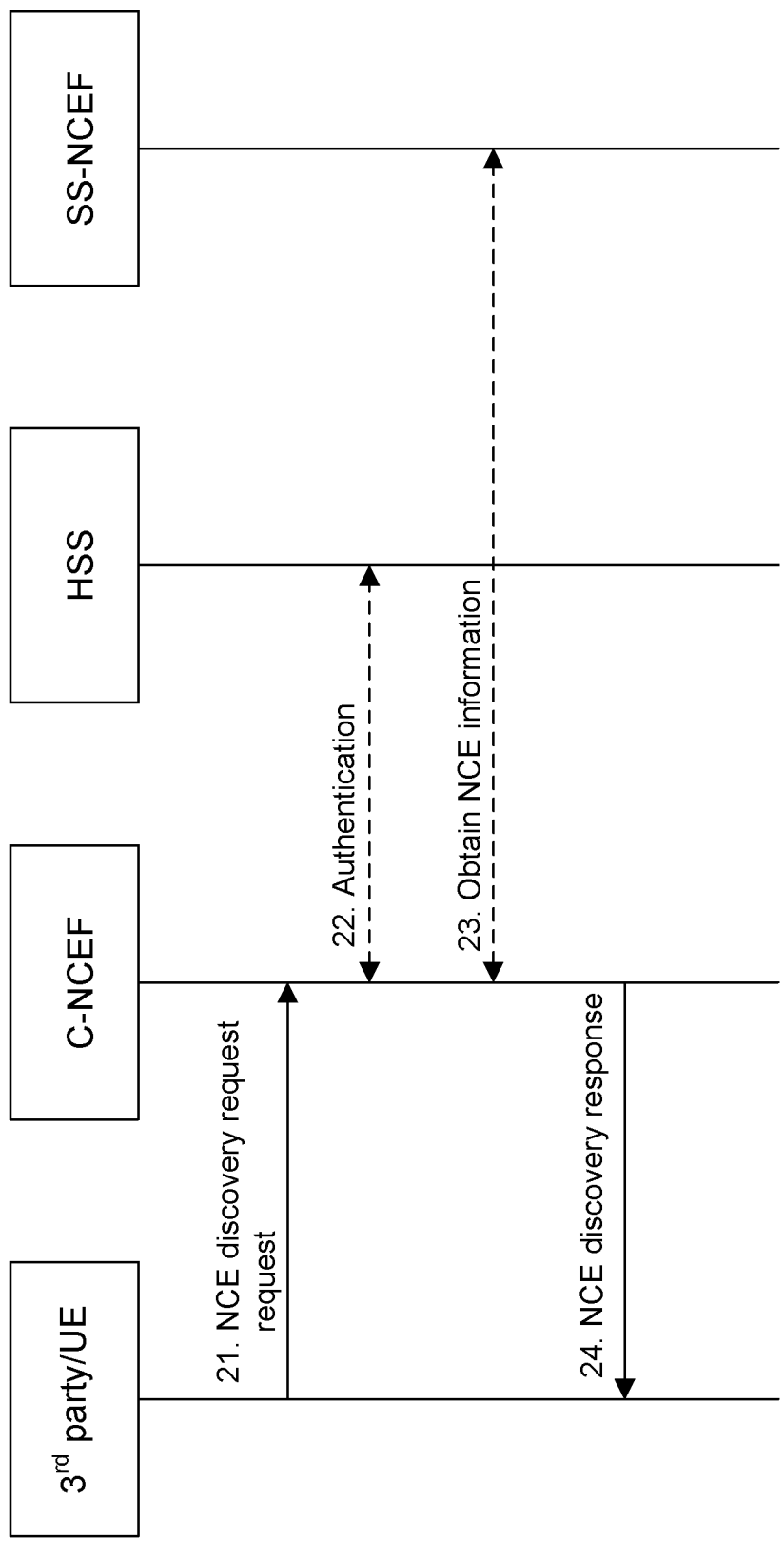
FIG. 2B is a call flow diagram illustrating a method for discovering exposed Network Capability Exposure (NCE) functions on a communications network, by a $3^{rd}$ party entity, according to another embodiment.

FIG. 2B is a call flow diagram illustrating a procedure for discovering exposed Network Capability Exposure (NCE) functions on a communications network, by a 3$^{rd}$ party entity or UE, according to an embodiment. The method shown in FIG. 2B may be performed over the communications network shown in FIG. 2A, for example. At step 21, the 3$^{rd}$ party sends a NCE discovery request to the C-NCEF function. The request may include the identity of the 3$^{rd}$ party, and may also include required network functions, whether common or NS-specific. At step 22, the C-NCEF function communicates with the HSS function to authenticate the 3$^{rd}$ party. At step 23, the C-NCEF function obtains the information relating to the NCE discovery request (from a corresponding SS NCEF) for requests relating to NS-specific network functions. In step 24, the C-NCEF function responds to the 3$^{rd}$ party with information, or exposure status detailing exposed or available network functions/capabilities.

Figure 2C:
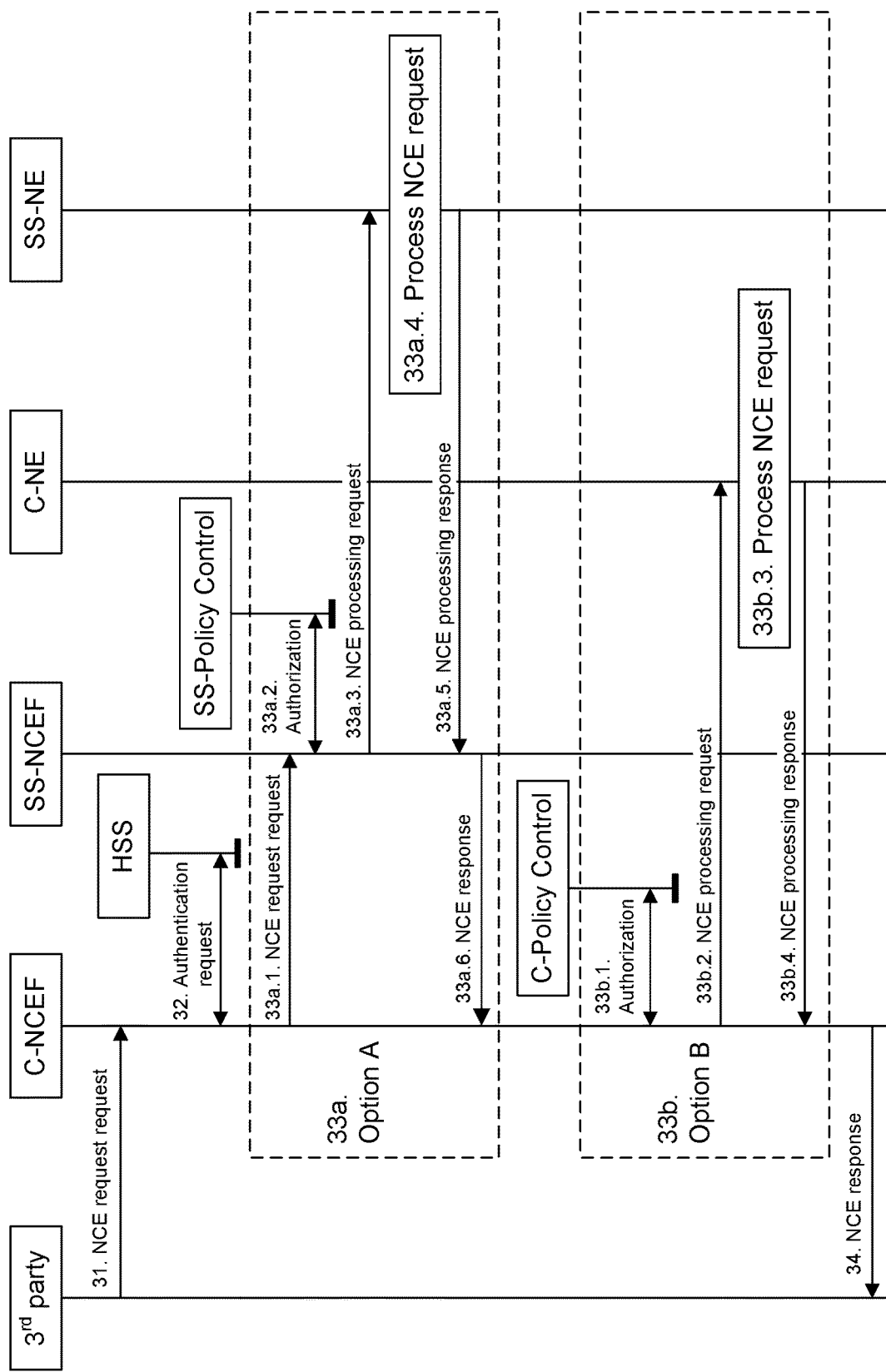
FIG. 2C is a call flow diagram illustrating a procedure for handling a NCE request on a communications network by a $3^{rd}$ party entity, according to another embodiment.

FIG. 2C is a call flow diagram illustrating a procedure for handling a Network Capability Exposure (NCE) request on a communications network, by a 3$^{rd}$ party entity (or a UE), according to an embodiment. The method shown in FIG. 2C may be performed over the communications network shown in FIG. 2A, for example. At step 31, the 3$^{rd}$ party sends a NCE request to the C-NCEF. The request can be a query or a configuration instruction to request certain network capabilities. At step 32, the C-NCEF communicates with the HSS to authenticate the 3$^{rd}$ party. Authorization can either be performed by the Network Slice (Option A 33*a*) or within the Common NE (Option B 33*b*) in accordance with the NCE request. For example, if the NCE request is NS-specific, the NCEF may forwards it to the respective SS NCEF for processing (see steps 33*a*.1-33*a*.6 of 'Option A' which perform SS authorization and processing). If the NCE request is not NS-specific, the Common NE can perform the processing itself (see steps 33*b*.1-33*b*.4 of 'Option B'). Finally, in step 34, the C-NCEF forwards an NCE response to the $3^{rd}$ parity, which may contain NCE information relating to the NCE request.

Figure 3A:
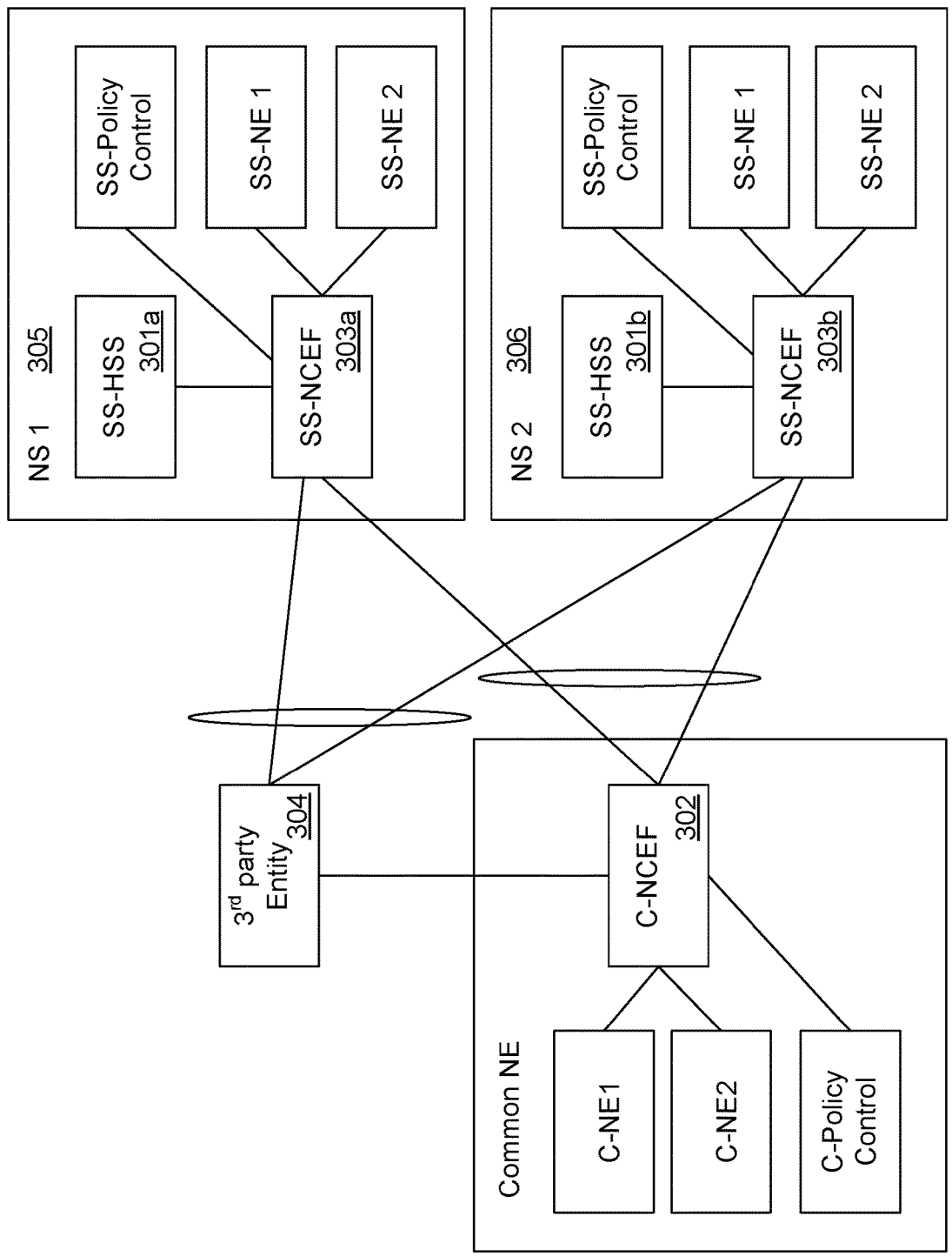
FIG. 3A is a functional schematic of a communications network, according to another embodiment.

FIG. 3A is a functional schematic of a communications network, according to another embodiment. The communications network shown in FIG. 3A is similar to that shown in FIG. 2A, except in that each Network Slice (NS1 305, NS2 306) further comprises a slice specific HSS function 301*a*, 301*b*, and that a $3^{rd}$ party Entity 304 may also interface with the SS-NCEF 303*a*, 303*b* of each network slice.

The communications network in FIG. 3A can perform isolated security (i.e. authentication), policy control (i.e. authorization) and OAM in certain embodiments. An authentication procedure can be carried out by the C-NCEF 302 or SS-NCEF, depending on whether the request is relates to the common NE or NS-specific NCE. The SS-NCEF may perform common request identification and redirection, allow external entities to discover exposed/ available NS-specific network features/capabilities, and perform authorization, access and execution of NS-specific system features under operator control. The C-NCEF can also allow external entities to discover available/exposed NS-specific network functions/capabilities, for example, via the SS-NCEF, and perform authorization, access and execution of common system capabilities under operator control. In certain embodiments, the $3^{rd}$ party entity may only interface with the SS-NCEF of the NS, and not the C-NCEF.

Beneficially, the communications network architecture shown in FIG. 3A can provide a distributed NCE, having a distributed interface, with distributed control. This architecture can assume isolated security (i.e. authentication) and isolated policy control (i.e. authorization), while offering isolated OAM. It may contain a common NCEF and multiple NS-specific NCEFs (one per NS). $3^{rd}$ parity entities may interface only with individual NS NCEF in some cases. Authentication may be performed by the NS NCEF; and authorization may be carried out by the common NCEF or NS NCEF, depending on whether the request is concerned with the common NCE or NS-specific NCE.

The NS NCEF may provide:
Common request identification and redirection (to the common NCEF)
The capability for the external entities to discover the exposed NS-specific network capabilities.
Authorization, access and execution of NS-specific system capabilities under operator control.
The Common NCEF may provide:
The capability for the external entities to discover the exposed NS-specific network capabilities, via NS-specific NCEF.
Authorization, access and execution of common system capabilities under operator control.

Figure 3B:
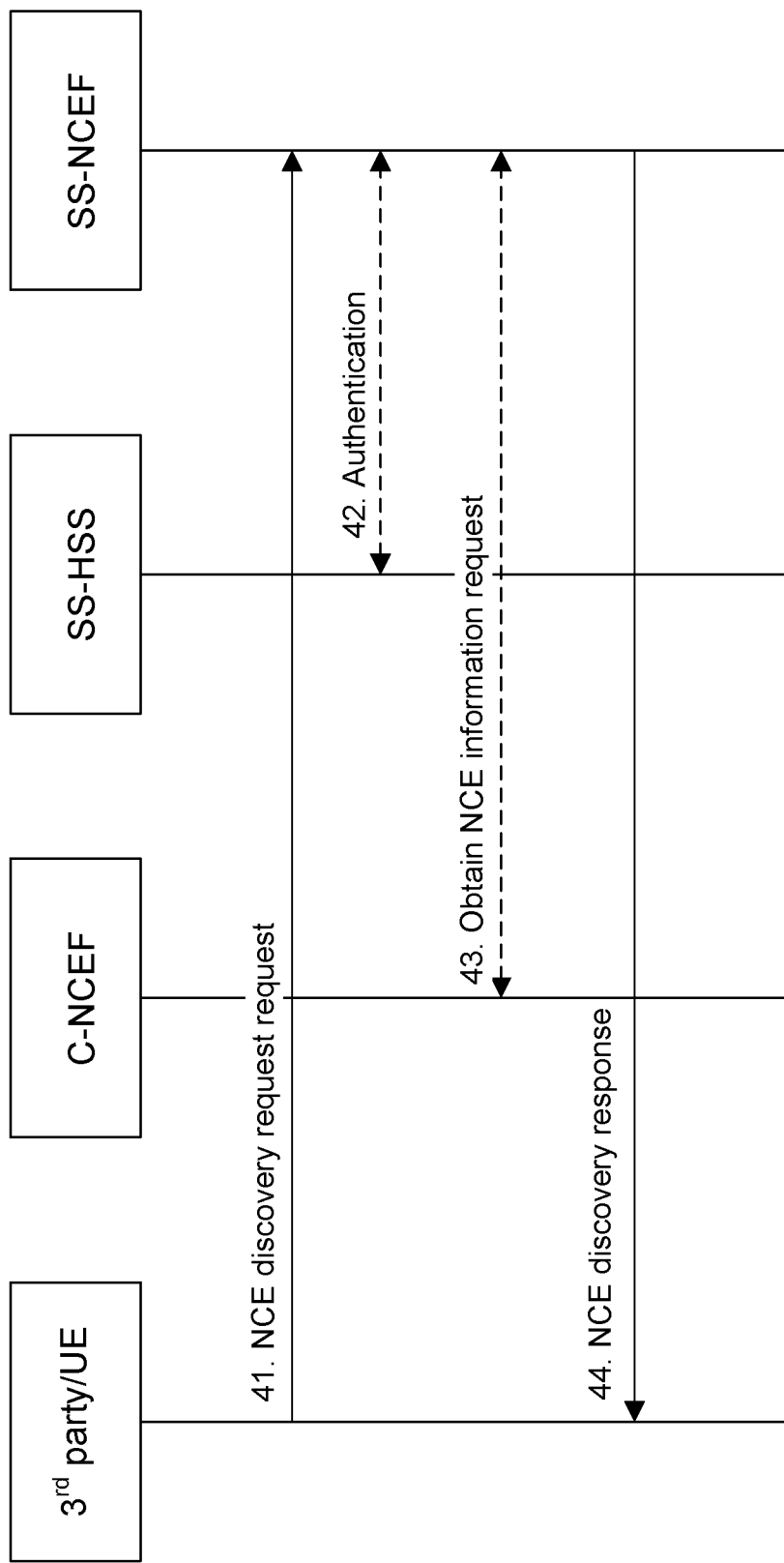
FIG. 3B is a call flow diagram illustrating a method for discovering exposed Network Capability Exposure (NCE) functions on a communications network, by a $3^{rd}$ party entity, according to another embodiment.

FIG. 3B is a call flow diagram illustrating a procedure for discovering exposed Network Capability Exposure (NCE) functions on a communications network, by a $3^{rd}$ party entity or UE, according to an embodiment. The method shown in FIG. 3B may be performed over the communications network shown in FIG. 3A, for example. At step 41, the $3^{rd}$ party/UE sends a NCE discovery request to the SS-NCEF function. The request may include the identity of the $3^{rd}$ party, and desired network functions/capabilities, whether NS-specific or otherwise. At step 42, the SS-NCEF function performs authentication of the $3^{rd}$ party, through communication with the SS HSS function. At step 43, the SS-NCEF function communicates with the C-NCEF function to obtain the requested information (relating to the request) if concerning common NE network functions/capabilities. At step 44, the SS NCEF function responds to the $3^{rd}$ party with information or exposure status of available/exposed network capabilities.

Figure 3C:
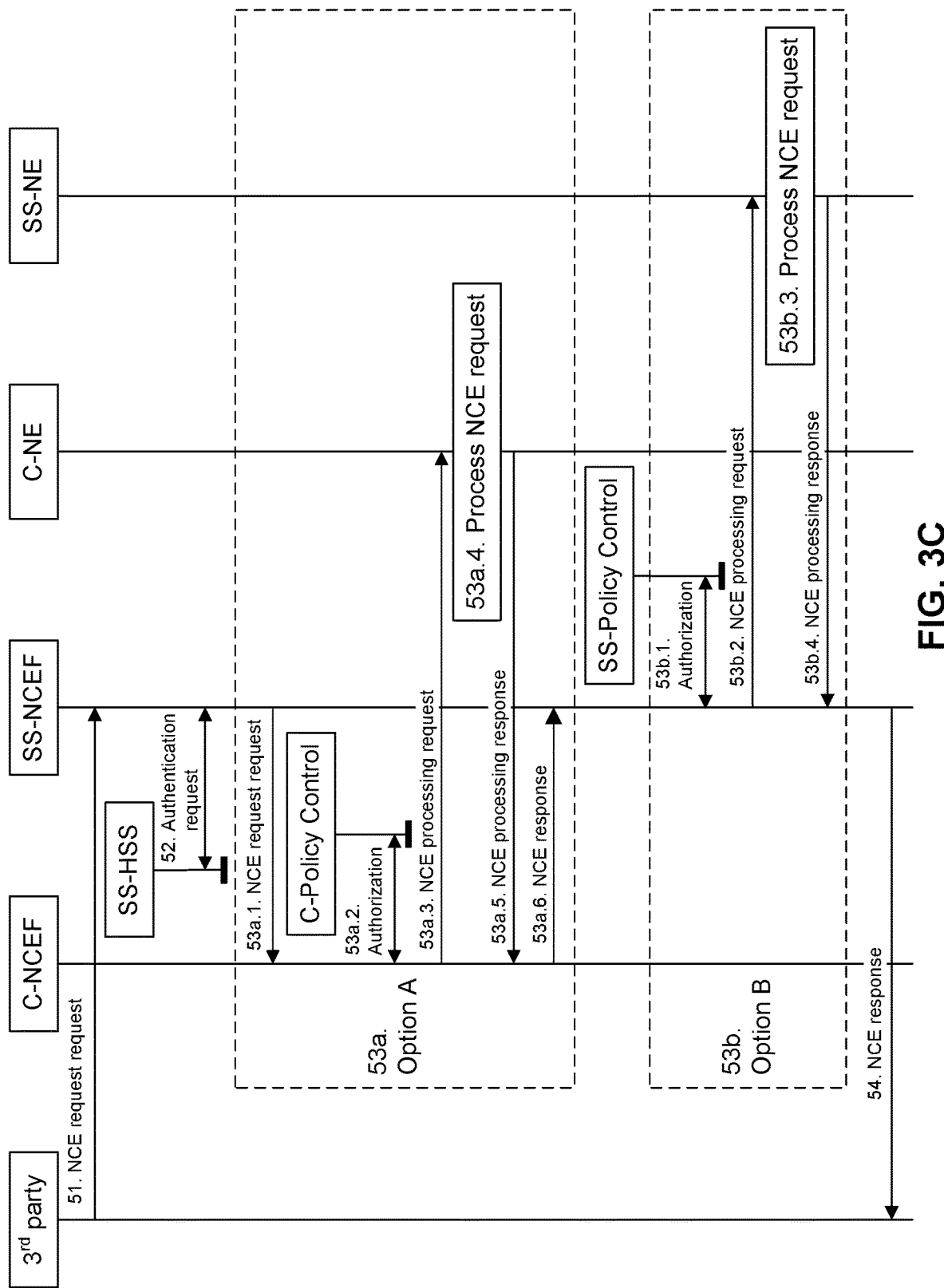
FIG. 3C is a call flow diagram illustrating a procedure for handling a NCE request on a communications network by a $3^{rd}$ party entity, according to another embodiment.

FIG. 3C is a call flow diagram illustrating a procedure for handling a Network Capability Exposure (NCE) request on a communications network, by a $3^{rd}$ party entity (or a UE), according to an embodiment. The method shown in FIG. 3C may be performed over the communications network shown in FIG. 3A, for example. At step 51, the $3^{rd}$ party sends a NCE request to the SS-NCEF. The request can be a query or a configuration instruction to request certain network capabilities. At step 52, the SS-NCEF communicates with the SS HSS to authenticate the $3^{rd}$ party. Authorization can either be performed by the Network Slice (Option B 53*b*) or within the Common NE (Option A 53*a*) in accordance with the NCE request. For example, if the NCE request is not NS-specific, the SS-NCEF can forward the request to the C-NCEF to perform processing of the request (see steps 53*a*.1-53*a*.6 of 'Option A'), and if the NCE request is NS-specific, the SS-NCEF may perform processing within the NS (see steps 53*b*.1-53*b*.4 of 'Option B' which perform SS authorization and processing). Finally, in step 54, the SS-NCEF forwards an NCE response to the $3^{rd}$ party, which may contain NCE information relating to the NCE request.

Figure 4:
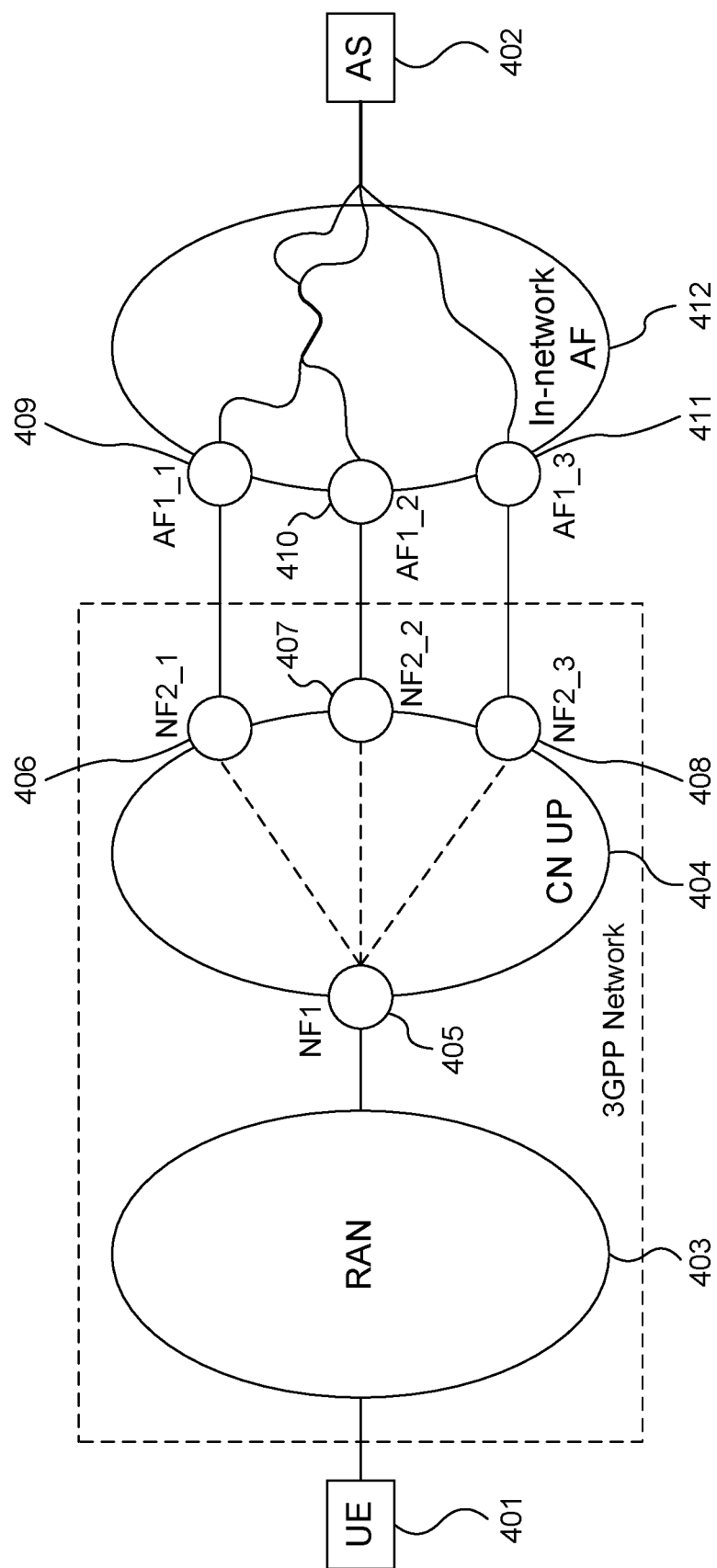
FIG. 4 is a logical schematic of a communications network, according to an embodiment.

FIG. 4 is a logical schematic of a communications network, according to an embodiment. The communications network of FIG. 4 illustrates various User Plane (UP) segments and paths that may be utilized. For example, for transmission of session requests and implementation of Session Management (SM) communications between a UE 401 and an Application System (AS) 402. It would be readily understood that FIG. 4 illustrates segments and paths that may be used, and that the example of a path provided is not necessarily explicitly illustrated in FIG. 4. As shown, the communications network comprises a 3GPP Network which includes a Radio Access Network (RAN) 403 coupled to a Core Network User Plane (CN UP) 404. The CN UP comprises network functions NF1 and NF2, deployed as logical entities within the 3GPP Network. NF2 comprises 3 different instances: NF2_1 405, NF2_2 406, NF2_3 407, each forming a different logical path to NF1 as shown. An In-network Application Function (In-network AF) comprises 3 different instances: AF1_1 409, AF1_2 410, AF1_3 411, each logically coupled to instances: NF2_1, NF2_2, NF2_3, respectively, and to the Application System (AS) collectively. According to embodiments, an In-network application function can refer to an application that is deployed in the network and is configured for traffic handling. The AS may be owned by a $3^{rd}$ party entity separate from the 3GPP network. In some embodiments, the In-Network AF 412 may be deployed on the 3GPP Network, or may be deployed on a separate physical network, such as the AS. In some embodiments, the In-Network AF 412 may be deployed on the 3GPP Network, or may be deployed on a separate network, such as the AS. It is understood that the 3GPP network and the network upon which the In-network AF is deployed may be logical networks deployed, and thus these two networks may overlap in the physical realm while being logically separated networks.

In some situations, certain traffic may require specific functional treatment by traversing certain functional entities/ instances, before reaching a required destination (e.g. like a Service Function Chain). For example, while a session is being established between a UE and an AS, a certain UP path may be preferred such that the traffic is exposed to a specific functional treatment associated with different functional entities or instances along the UP path. The UP path may be chosen to reduce the loading status of certain applications/nodes/entities, or to enhance specific application performance. Additionally, some applications may have limited data processing ability (i.e. limiting incoming data rate), and therefore an effective SM function should select a UP path to avoid overloading and maintain Quality of Service (QoS) provisioning given knowledge of Application function limitations.

As an illustrative example referring to FIG. 4, suppose the UE wishes to transmit a session request to the AS, and it is preferred that the traffic traverse AF1_3 given its processing capacity. It is understood that the session request transmitted by the UE to the AS is an application level session request. If the 3GPP network is unaware of this, it may select another UP path (for example, NF2_1 which leads to AF1_1) which may be relatively more overloaded, and result in inefficient resource management and a reduced QoS. Accordingly, exposure of SM information may provide the Network or AS with the necessary information to more effectively determine appropriate logical functions and its corresponding UP path to improve overall network performance and resource management. SM information may also be used to inform the resulting QoS when performing a network service. As will be discussed in further detail below, a $3^{rd}$ party entity, such as the AS, may specify appropriate in-network AFs and the corresponding UP path given SM information and capabilities.

Figure 5A:
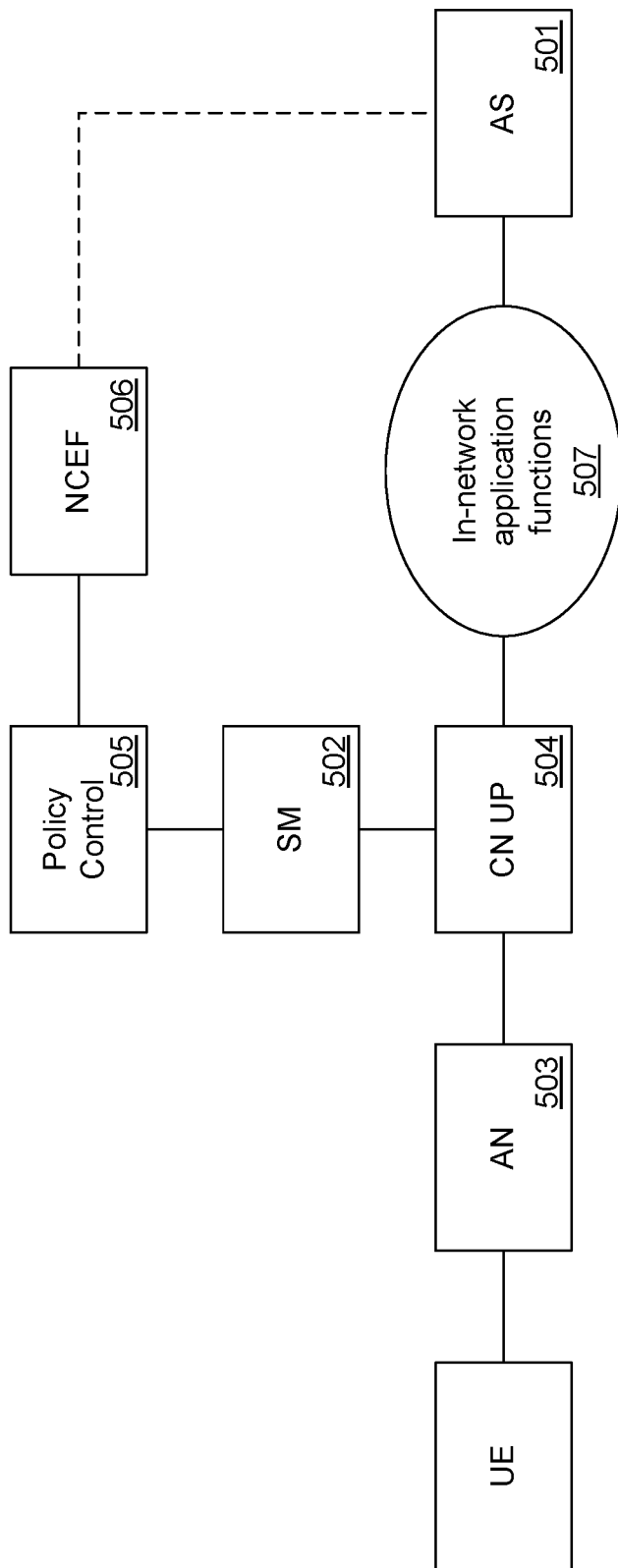
FIG. 5A is a logical schematic of a communications network, according to another embodiment.

FIG. 5A is a logical schematic of a communications network, according to another embodiment. The communications network of FIG. 5A may be used to provide an Application System (AS) 501, which may be operated by a $3^{rd}$ party separate from the network, with Session Management (SM) capability over the network, including UP path selection and QoS setup for related services. As shown in FIG. 5A, the communications network comprises an Access Node (AN) 503, a Core Network User Plane (CN UP) 504, a Session Management (SM) module 502, a Policy Control function 505, an NCEF function 506, and "In-network Application Functions" 507 which may be deployed on the CN UP (not shown). A UE interfaces with the network via the AN, while the AS interfaces with the "In-network Application Functions", and potentially the NCEF function, as shown. As previously discussed, the network capability exposure function (NCEF) is configured to interface with external functions/entities. For example, the NCEF can be considered to be similar to a service capability exposure function (SCEF) which provides a means to securely expose the services and capabilities provided by network interfaces. As would be readily understood, an alternate name for a NCEF can be a network exposure function (NEF). Furthermore, it would also be understood that the session management module (SM) could also be termed the session management function (SMF).

Figure 5B:
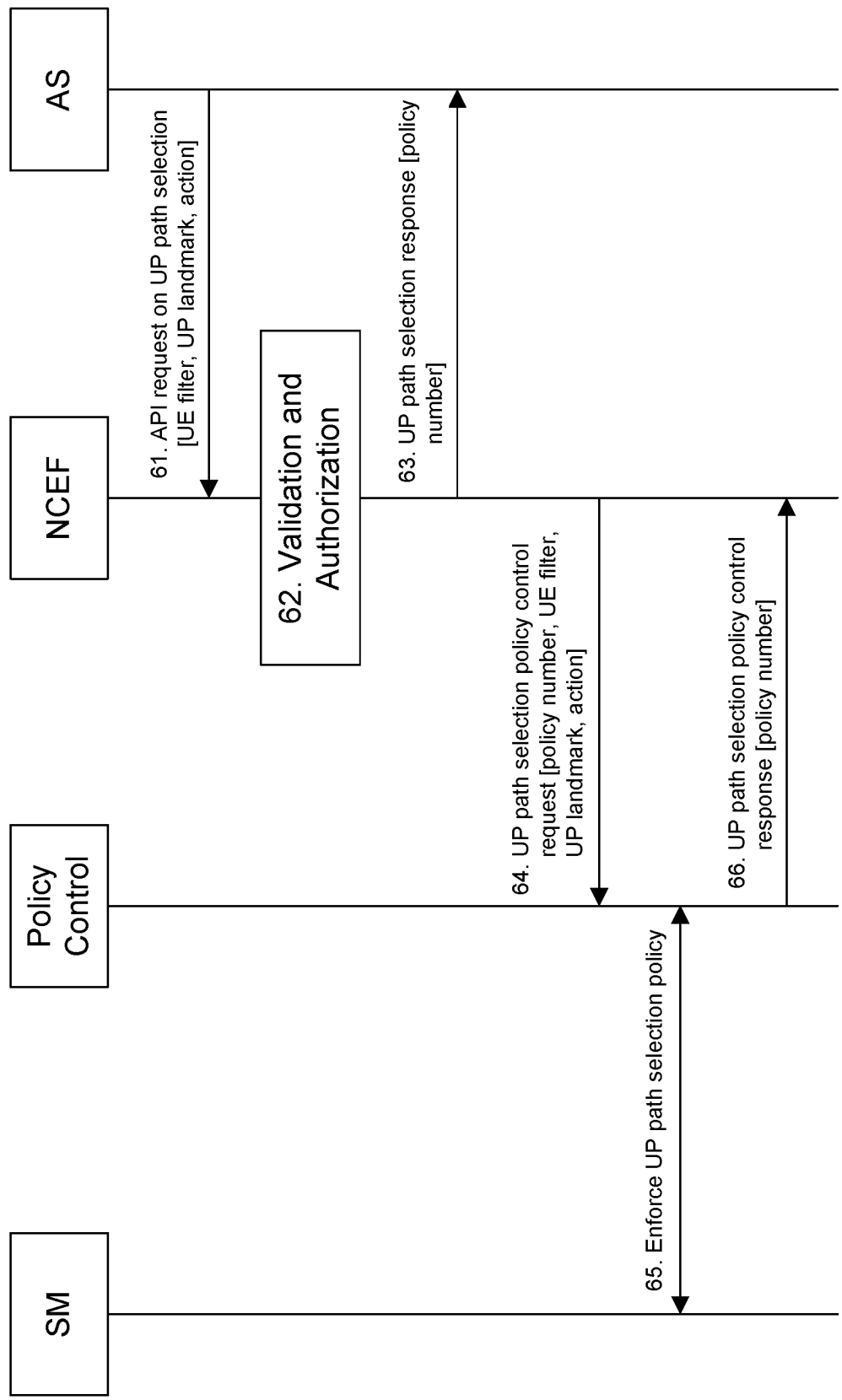
FIG. 5B is a call flow diagram illustrating a method for a $3^{rd}$ party Application System (AS) to control User Plane path selection over a communications network, according to an embodiment.

FIG. 5B is a call flow diagram illustrating a method for a $3^{rd}$ party AS to control UP path selection over a communications network, according to the embodiment. For example, the method of FIG. 5B may be applied to the network of FIG. 5A, in certain embodiments. At step 61, the AS sends an Application Program Interface (API) based request for UP path selection, to the NCEF. As would be understood, an API based request can be considered a request for UP path selection from the $3^{rd}$ party, or $3^{rd}$ party AS. The request can be understood to be configured as information relating to the UP path selection, wherein this information may include UE filter information that indicates which UE the requested UP path selection should be applied to. The request may also include information relating to UP landmarks which should be respected during UP path selection, and further action to be taken with respect to the UP landmark. Possible actions may include: CONVERAGE_TO or DIVERAGE_FROM, GO_THROUGH, or VISIT_IN_ORDER, implying that UEs session should use UP paths that converge to, diverge from, go through, visit in an orderly manner the UP landmark(s). According to embodiments, the request may indicate one or more UP landmarks which should be respected during UP path selection or re-selection. As would be understood, a UP landmark can be an identifier associated with a particular location or point within the user plane or the network and may be considered to be a logical network destination. For example a UP landmark can be an identifier associated with an access location associated with a data network, which may be considered a data network access identifier (DNAI) or other identifier. At step 62, the NCEF performs validation and authorization of the request. A request may be invalid because of wrong/inconsistent parameters, or due to the access control policy refusing validation, for example. In some embodiments, other security measures such as authentication may also be applied during this step. In step 63, the NCEF function transmits a response back to the AS. The response may confirm the policy installation or indicate an installation failure, and may further include a policy number for the request. As would be readily understood, a policy number can be a form of an identifier, for example a number or alpha-numeric sequence or other identifier, that is associated with or identifies a UP path selection policy that is associated with or results from the request for UP path selection. The policy number can be provided by the AS to the UE, and the UE may include the policy number in its session request. Inclusion of the policy number in the session request can inform the SM function of whether it needs to apply any specific policy. In step 64, the NCEF sends a UP path selection policy control request to the Policy Control function, to trigger installation of the UP path selection policy if the AS is authorized to do such. This request may also be generated in accordance from the UP path selection request received from the AS in step 61. In step 65, the policy control function communicates with the SM function to enforce the policy. For example, the SM function may insert a policy number in a locally maintained policy list. Where there is a session request, the SM function may look for an embedded policy number and verify it against the list: if the policy number is valid, it obtains the policy details from the policy control function and applies it; otherwise invalid policy numbers may be ignored. Alternatively, the SM function may check with the Policy control function for every session request by providing UE information. As would be readily understood, the SM function may apply another method for managing the one or more UP path selection policies. In step 66, the policy control function sends a UP path selection policy control response back to the NCEF. In certain embodiments, step 63 may be deferred until after completion of step 66 as shown in FIG. 5B.

In addition, having further regarding to FIG. 5B, as previously discussed the API request may include UE filter information that indicates which UE the requested UP path selection should be applied, UP landmarks which should be respected during UP path selection, and further action to be taken with respect to the UP landmarks, wherein these actions can define that UE session should use UP paths that converge to, diverge from, go through, visit in an orderly manner the UP landmarks. As such the API request can be equated or equivalent to a traffic steering request received from the Application System, for example an Application Function or Application Controller or other application centric system. As would be readily understood, traffic steering can include the determination of routing decisions as they relate to User Plane traffic which can be defined by protocol data unit (PDU) sessions.

In addition, for example, the step of enforcing an API request or traffic steering request can include obtaining, by a SM, policy or path details from the PCF, wherein these policy or path details are indicative of the requested UP path selection. As such it is the PCF that is transmitting, sending or transferring the rules indicative of the traffic steering request or requested UP path selection policy to the SM.

Furthermore, as would be readily understood by one skilled in the art that the step of validation and authorization could also be term authentication and authorization, given that validation is an action taken for checking or proving the validity or accuracy of something and that authentication is an action of proving or showing something to be true, genuine or valid.

Figure 5C:
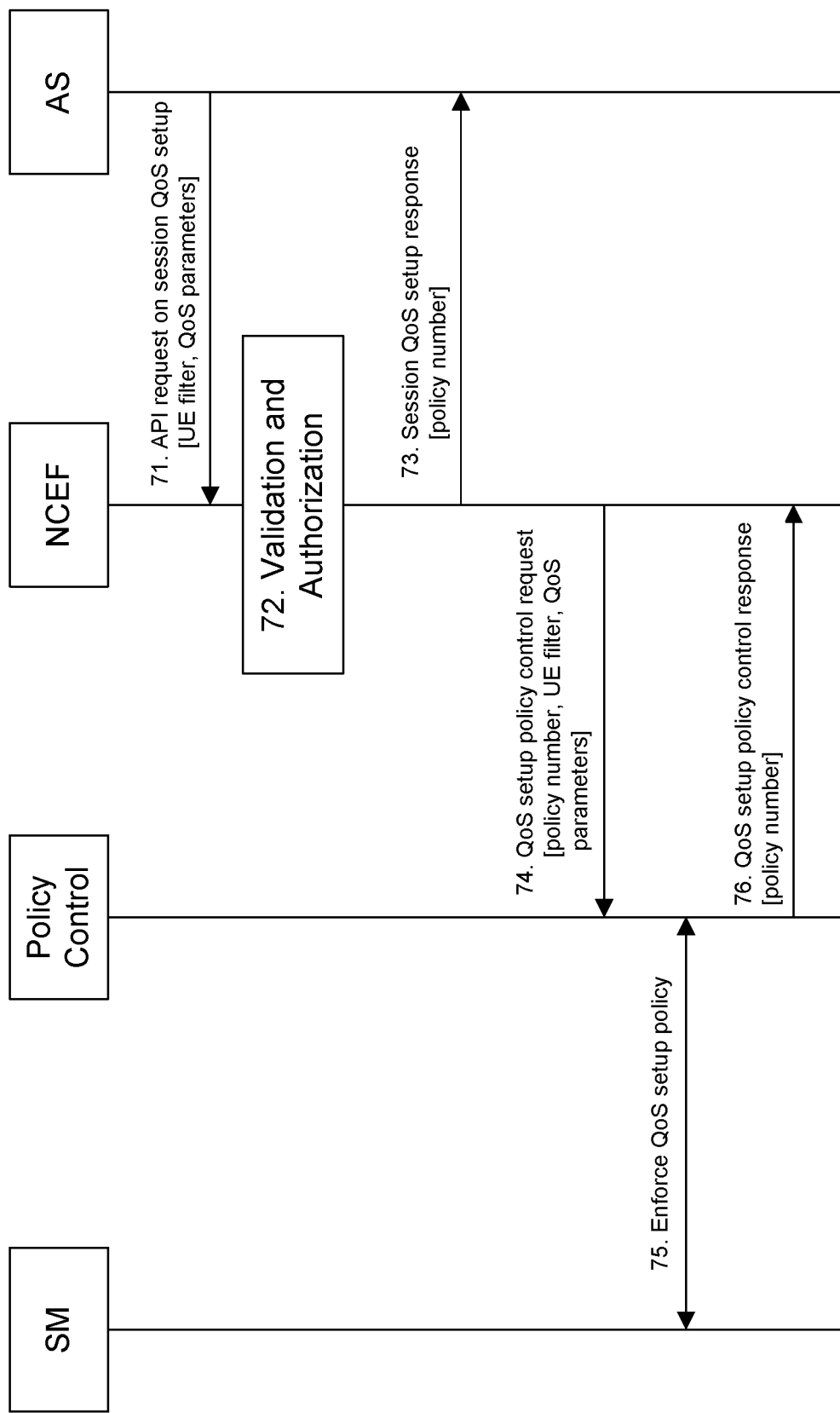
FIG. 5C is a call flow diagram illustrating a method for a $3^{rd}$ party AS to control QoS setup over a communications network, according to an embodiment.

FIG. 5C is a call flow diagram illustrating a method for a $3^{rd}$ party AS to perform QoS setup over a communications network, according to an embodiment. For example, the method of FIG. 5C may be applied to the network of FIG. 5A, in certain embodiments. At step 71, the AS sends an API-based request for session QoS setup to the NCEF. The request may include UE filter information that indicates which UE the requested session QoS setup should be applied to, as well as QoS parameters that should be applied/respected/enforced during session management. At step 72, the NCEF performs validation and authorization for the AS. In certain embodiments, the request may be invalid due to wrong/inconsistent parameters, or because of the access control policy. Other security measure such as authentication may be applied during this step also. At step 73, the NCEF function sends a QoS setup response back to the AS. The response may confirm the policy installation, or indicate an installation failure, for example. It may further include a policy number for the request. In some embodiments, the policy number can be provided to the UE, and the UE may include the policy number in its session request. This may allow the SM function to search for a policy number in the session request, to determine whether it needs to apply any specific policy to the session. At step 74, the NCEF sends a session QoS setup policy control request to the policy control function, to trigger installation of the session QoS setup policy if the AS has been authorized. The request may be generated based on the session QoS setup request received from the AS (in step 71) for example. At step 75, the policy control function communicates with the SM function to enforce the policy.

For example, SM function may insert the policy number in a locally maintained policy list. During a session request, the SM function may search for an embedded policy number and verify it against the list, if the policy number is valid, it obtains the policy detail from the policy control function and applies it, otherwise it may ignore an invalid policy number. Alternatively, the SM function may check with the Policy Control function for every session request by providing UE information. As would be readily understood, the SM function may apply another method for managing the one or more policies. At step 76, the policy control function sends a UP path selection policy control response back to the NCEF. Having further reference to FIG. 5C, at step 76, the policy control function can send a QoS setup policy control response back to the NCEF, wherein this QoS setup policy control response can indicate the policy number.

Figure 5D:
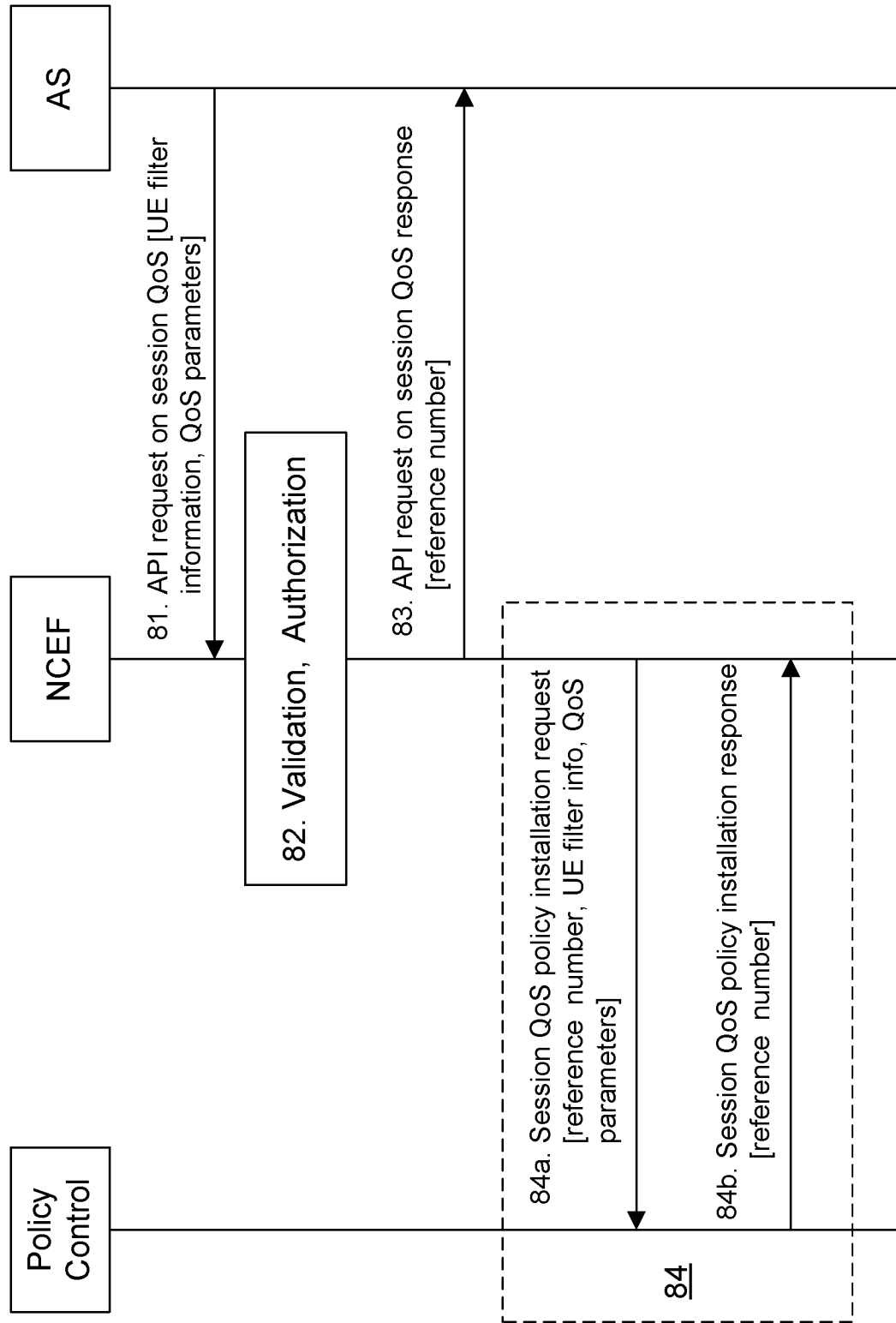
FIG. 5D is a call flow diagram illustrating a method for a $3^{rd}$ party AS to perform a session QoS policy installation on a communications network, according to an embodiment.

FIG. 5D is a call flow diagram illustrating a method for a $3^{rd}$ party AS to perform a session QoS policy installation on a communications network, according to an embodiment. For example, the method of FIG. 5D may be applied to the network of FIG. 5A, in certain embodiments. At step 81 the AS sends an API-based request on session QoS to the NCEF. The request may include UE filter information that indicates which UE the requested Session QoS should apply to, and QoS parameters to be respected/enforced during UP path selection. In step 82, the NCEF performs validation and authorization according to the request. The request may be invalid for example, due to wrong/inconsistent parameters, or due to the access control policy. Other security measures such as authentication, may also be applied at this step. In step 83, the NCEF function sends a Session QoS response back to the NCEF. The response may confirm the policy installation, or indicate an installation failure. It may also include a reference number for the request, for tracking or management purposes. If the request from the AS is validated and authorized (step 82), the NCEF then triggers the installation of the session QoS policy in step 84. This may comprise for example, step 84a where the NCEF sends a session QoS policy installation request to the Policy Control function (the request may be generated in accordance with the raw session QoS request received from the AS (in step 81)), the policy control function then installs the policy, and in step 84b the Policy control function sends a response back to the NCEF. The response may include a reference number or a confirmation that the installation was successful.

Figure 5E:
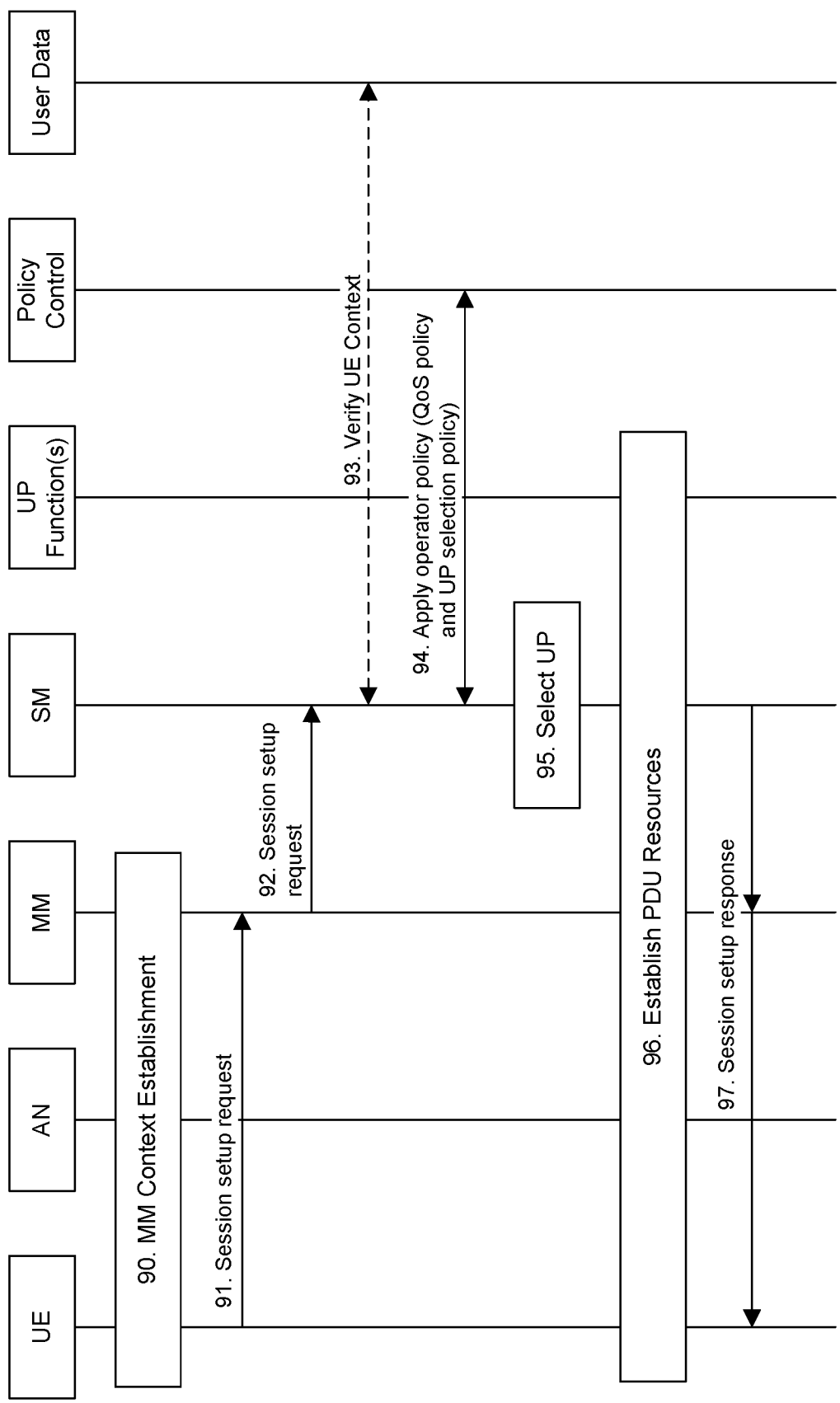
FIG. 5E is a call flow diagram illustrating a method for UE to perform a session setup procedure on a communications network, according to an embodiment.

FIG. 5E is a call flow diagram illustrating a method for UE to perform a session setup procedure on a communications network, according to an embodiment. For example, the method of FIG. 5E may be applied to the network of FIG. 5A, in certain embodiments. At step 90, the UE is attached (to the Access Node (AN) and/or Mobility Management (MM) entity, for example) and has established a MM context through an MM procedure, which may include authentication. At step 91, the UE sends a session setup request to the MM function. At step 92, the MM function forwards the session setup request to an appropriate SM function. At step 93, the SM function verifies that the UE subscribed to a service, for example by fetching User Data information, and/or related information and performing comparison to verify UE context. At step 94, the SM function may interact with the Policy control function, which may determine session management policies, including UP path selection policy and QoS policy of the connection, based on information such as the UE request, and operator policy (which may be customized by the AS). In step 95, the SM function selects the UP path, for example with respect to the UP path selection policy. In step 96, the SM triggers to the establishment of PDU resources with respect to the selected UP path and the QoS policy. Finally, in step 97, the SM sends a session setup response to the UE (for example via the MM function).

Aspects of the present invention also provide for traffic steering functionality, such as the selection or reselection of UP paths in view of changing network conditions. Referring back to FIG. 4 for example, as sessions are being established between the UE and the AS according to a service subscription, UP paths involving some in-network AFs (for example, AF1_1 or another functional instance) may be preferred for particular UEs due to their current load, QoS requirements, or for application-level reasons. For example, some AFs may have greater data processing capacity (from their own processing load constraints or due to processing limitations along the path to the AS). Accordingly, application-layer load balancing functionality may divide UE traffic between in-network AFs to better address competing processing demands and improve network operating efficiency. In another example, a group of MTC devices may detect a certain regional event, and their traffic may preferably be routed to the AS through a specific in-network AF that is processing the event in order to maintain the event context. Yet another example applies to low latency scenarios where AF reselection or relocation is needed for UE mobility to meet reliability and low latency requirements.

While traffic steering control (e.g. from a UP gateway (NF2_1, NF2_2, etc.) to an in-network AF (AF1_1, AF1_2, etc.), and vice versa) may be directed between the UP and the in-network AFs, for example traffic steering control may be used to direct network traffic between a UP gateway and the in-network AFs. The use of certain paths involving specific UP gateways may provide more efficient (from a cost and resource utilization viewpoint) and effective (e.g. in terms of performance such as delay, throughput or rate) traffic steering results. This is because the transport (or routing) capability between UP gateways and the in-network AFs may be different, and may vary over time due to network and load dynamics. Further, when considering connectivity costs associated with certain UP paths or gateways, and dynamic pricing structures associated with certain links, certain UP paths may be more cost effective dependent on throughput, charges, and other timing considerations. Accordingly, an effective traffic steering strategy may need to consider all of these factors in selecting/reselecting a UP path between a UE and AS in a communications system.

Figure 6A:
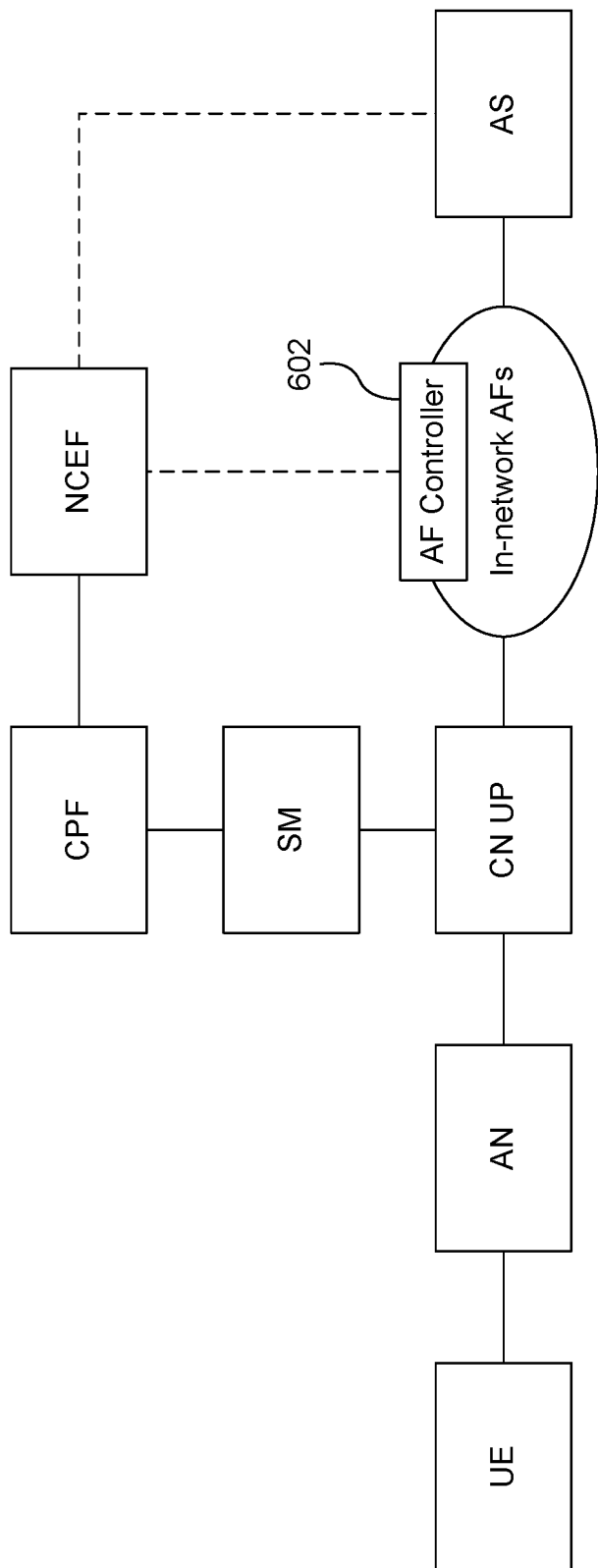
FIG. 6A is a logical schematic of a communications network, according to another embodiment.

FIG. 6A is a logical schematic of a communications network, according to another embodiment. The communications network of FIG. 6A is similar to that shown in FIG. 5A, but further includes an Application Function (AF) controller 602 that manages the In-network AF, and comprises a Control Plane Function (CPF) instead of a Policy Control function. However, in some embodiments, the CPF may comprise a Policy Control function. The communications network of FIG. 6A can operate in much the same way as that shown in FIG. 5A, while additionally providing application aware UP path selection or reselection functionality. The CPF is a function that maintains UP selection or reselection configuration data, and may be integrated with the SM function (or another function such as a Policy Control function) in certain embodiments. The AF Controller can determine and configure traffic steering rules, such as for implementation within the in-network AF.

Figure 6B:
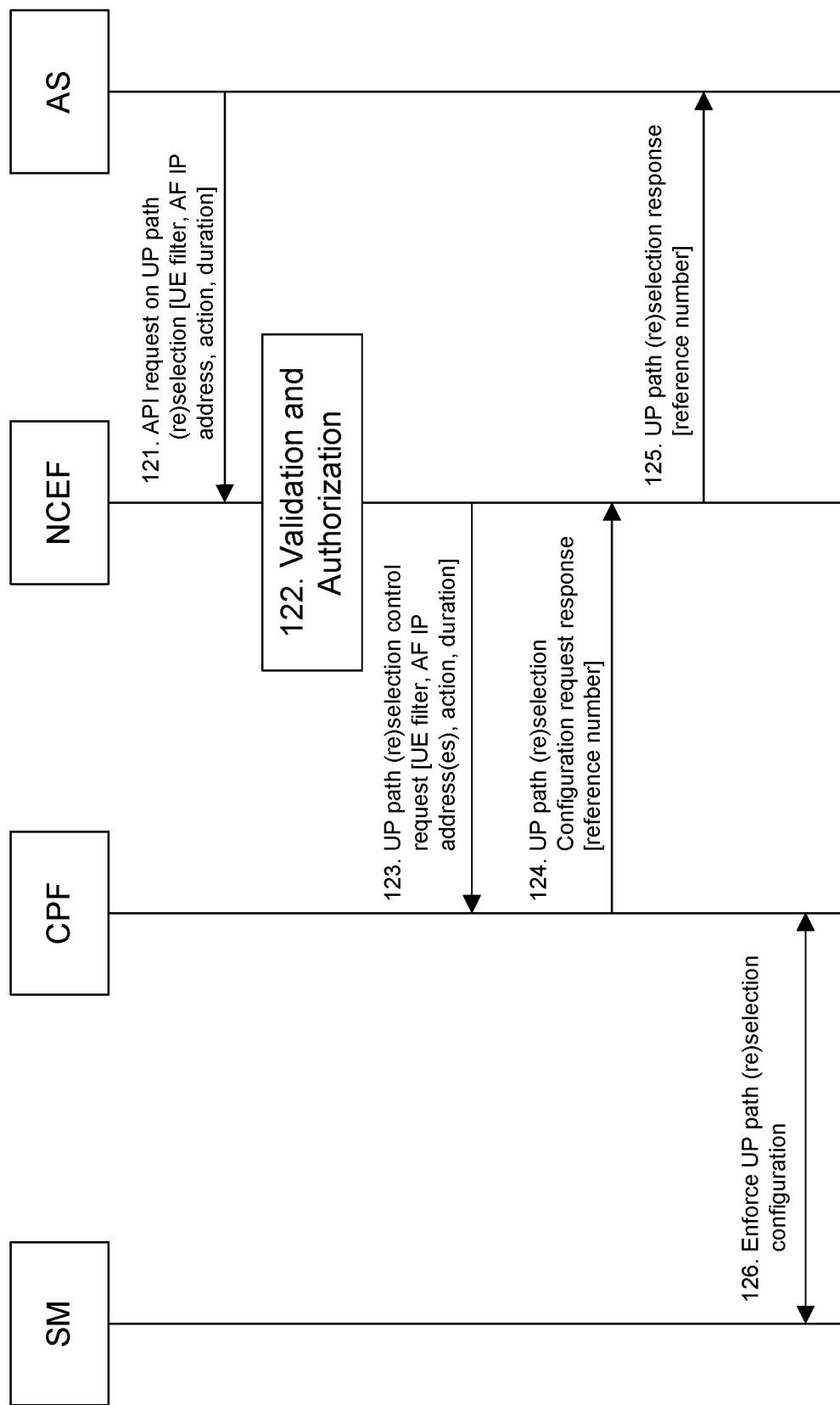
FIG. 6B is a call flow diagram illustrating a method for a $3^{rd}$ party AS to control UP path selection or reselection over a communications network, according to an embodiment.

FIG. 6B is a call flow diagram illustrating a method for a $3^{rd}$ party AS to control or influence UP path selection or reselection over a communications network, according to an embodiment. For example, the method of FIG. 6B may be applied to the network of FIG. 6A, in certain embodiments. At step 121, the AS sends an API-based request to the NCEF for UP path selection or reselection. The request may include for example, UE filter information that indicates which UE the selected UP path should be applied to, and a duration or time interval during which the requested UP path selection or reselection (configuration) should be performed. As would be understood, the duration or time interval can define a period when a requested UP path selection or reselection is to apply, which can be indicative of traffic routing. As such the duration or time interval can be considered a temporal parameter, for example a temporal validity condition. The request may also include in-network AF locations (for example, via IP addresses) which should be included/respected in the UP path selection or reselection. The request may also include certain actions which should be taken during UP path selection or reselection with respect to the specified in-network AF locations. Possible actions include CONVERAGE_TO_ANY or DIVERAGE_FROM_ALL, implying that UE sessions should use UP paths that converge to any of or diverge from all of the specified in-network AFs. Other actions are possible. At step 122, the NCEF performs validation and authorization on the request. For example, a request may be invalid due to wrong/inconsistent parameters, or due to an access control policy function (not shown). Other security measures such as authentication may also be applied. In step 123, the NCEF sends a UP path selection or reselection control request to the CPF. The request may be generated from the UP path selection or reselection request received from the AS (in step 121). In step 124, the CPF decides whether to accept the UP path selection or reselection request, and if so, sends a UP path selection or reselection configuration response back to the NCEF. The message may confirm the change request acceptance or notify of its rejection. According to embodiments, and with further reference to FIG. 6B, the message transmitted form the CPF to the NCEF may confirm the UP path selection or re-selection request acceptance or notify of its rejection. If accepted, the message may include a reference number. In step 125, the NCEF function sends a UP path selection or reselection response back to the AS. The message may acknowledge the acceptance of the requested UP path selection or reselection, or indicate a rejection of it. In the case of acceptance, the message may include the reference number assigned by the CPF. The reference number can then be provided to the UE to include it in a session request. Accordingly, the SM function can simply search for a reference number in a session request in order to determine whether a specific path configuration or policy should be applied. In step 126, if the UP path selection or reselection request is accepted, the CPF enforces it with the SM function; this may be carried out concurrently with steps 124 and 125. In some situations, enforcement may comprise the CPF informing the SM function to insert the reference/policy number in a locally maintained policy list, and triggering the SM function to perform UP path reselection for qualifying sessions. For subsequent session requests, the SM function may look for an embedded reference/policy number and, verify it against the list. If the reference number is valid, it obtains the path/policy detail from the CPF to apply. Otherwise, if the reference number is invalid it can be ignored. Alternatively, enforcement may comprise the CPF informing the SM function to check for existing sessions and new session requests with the CPF by providing the UE information. As would be readily understood, the CPF or the PCF may apply another method for enforcing the one or more policies. In certain embodiments, if validation or authorization fails at step 122, steps 123 and 124 can be skipped, and the AS is informed of the failed validation in step 125.

Figure 6C:
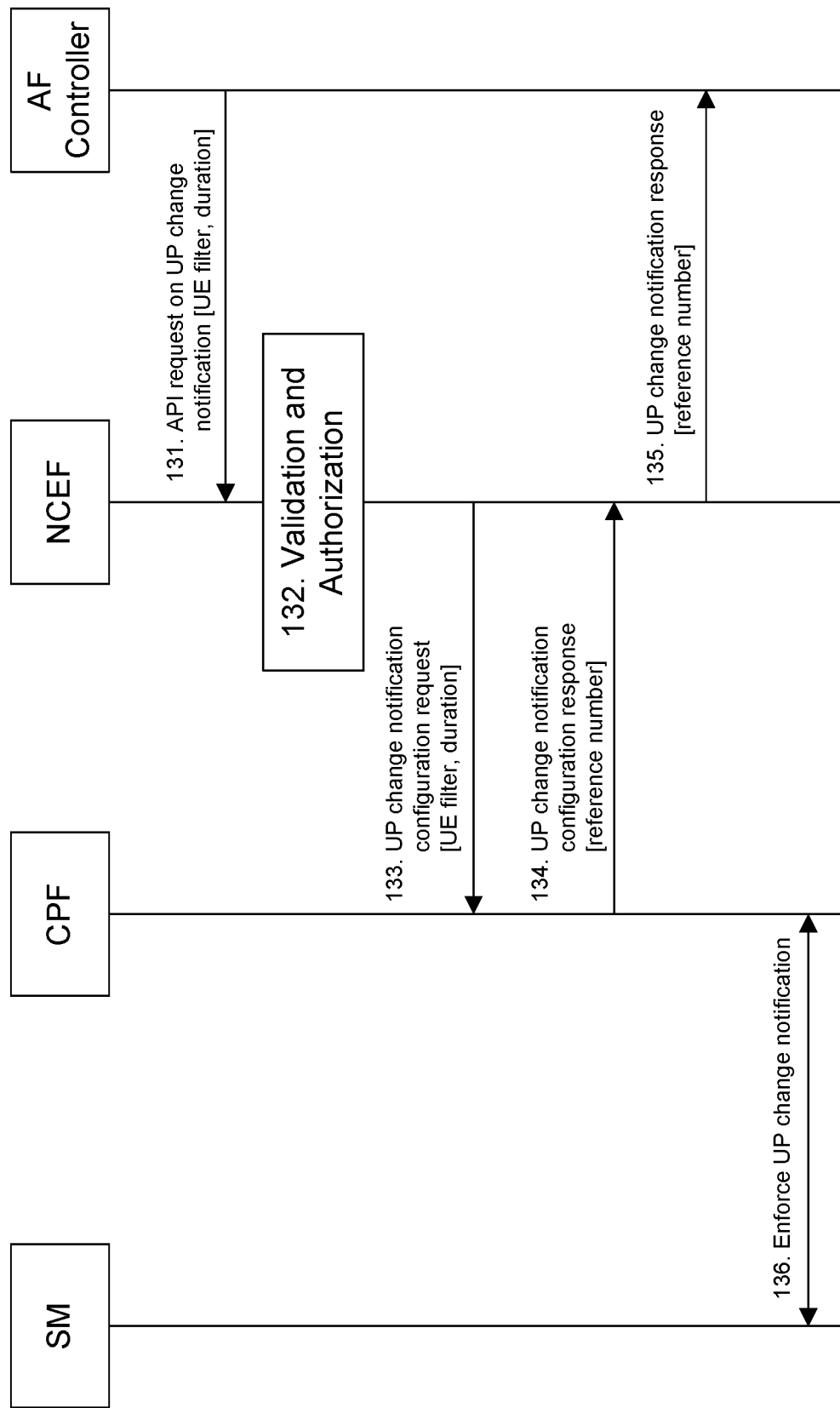
FIG. 6C is a call flow diagram illustrating a method for notifying network elements of UP changes, according to an embodiment.

FIG. 6C is a call flow diagram illustrating a method for notifying network elements of UP changes, according to an embodiment. The UP changes may related to changes in a UP path initiated by a $3^{rd}$ party AS, and the method may allow for notification of reconfiguration/re-routing of incoming packets to appropriately arrive to their next logical network destination (e.g. UP gateway) in view of UP path changes. According to embodiments, a logical network destination may be defined by a UP landmark which can be an identifier associated with a particular location or point within the user plane or the network. For example a UP landmark can be an identifier associated with an access location associated with a data network, which may be considered a data network access identifier (DNAI) or other identifier. The method of FIG. 6C may be applied to the network of FIG. 6A, in certain embodiments. In step 131, the AF controller sends an API-based request to provide UP change notification to the NCEF. As would be understood, an API based request can be considered a request for UP path change notification from the 3$^{rd}$ party, or 3$^{rd}$ party AS. The request can be understood to be configured as information relating to the UP path change notification, wherein the information may include UE filter information that indicates which UE the requested UP change notification refers to, and may include a duration (or time interval) indicating when the UP change notification should be generated. According to some embodiments, the information can include an indication of when the 3$^{rd}$ party AS is to be notified of UP changes, for example the 3$^{rd}$ party AS requests to be notified before UP path selection or reselection or the 3$^{rd}$ party AS requests to be notified after UP path selection or reselection. At step 132, the NCEF performs validation and authorization on the request. The request may be invalidated due to wrong/inconsistent parameters, or due to policy control access reasons. Other security measures, such as authentication may also be applied in this step. At step 133, the NCEF sends a UP change notification configuration request to the CPF. The request may be generated from the raw UP change notification request received from the AF controller (in step 131). The CPF may then decide whether to accept the requested UP change notification configuration, and at step 134, sends a UP change notification configuration response back to the NCEF. The message may confirm the configuration acceptance (by including a reference number, for example), or notify of its rejection. In step 135, the NCEF function sends a response back to the AF controller. The message may acknowledge the acceptance of the API-based UP change notification request, or indicate a rejection. In the case of acceptance, the message may include the reference number assigned by the CPF. The reference number can then be send by the AF controller to the UE (not shown), and the UE may include the reference number in its session request. This allows the SM function to lookup the reference number in any session request, to determine whether it needs to apply any UP path selection or reselection configuration, for example. In step 136, if the requested UP gateway change notification configuration is accepted, the CPF enforces it using the SM function. This may be carried out concurrently with steps 134 and 135. In certain embodiments, the enforcement may comprise the CPF informing the SM function to match/associate qualifying sessions with the reference number, and performing UP gateway change notification for those sessions. In subsequent session requests, the SM function may looks for an embedded reference number, obtain configuration details from the CFP, and if applicable, associate sessions with the reference number and send notification. In some cases, Invalid reference number can be simply ignored. In other embodiments, enforcement may comprise the CPF informing the SM function to check for existing sessions and new session requests with the CPF by providing the UE information. As would be readily understood, the CPF or the PCF may apply another method for enforcing the one or more policies on the existing sessions and new session requests. In certain embodiments, if validation and authorization fails in step 132, steps 133 and 134 may be skipped, and the AF controller may be informed about the failure in step 135.

Figure 6D:
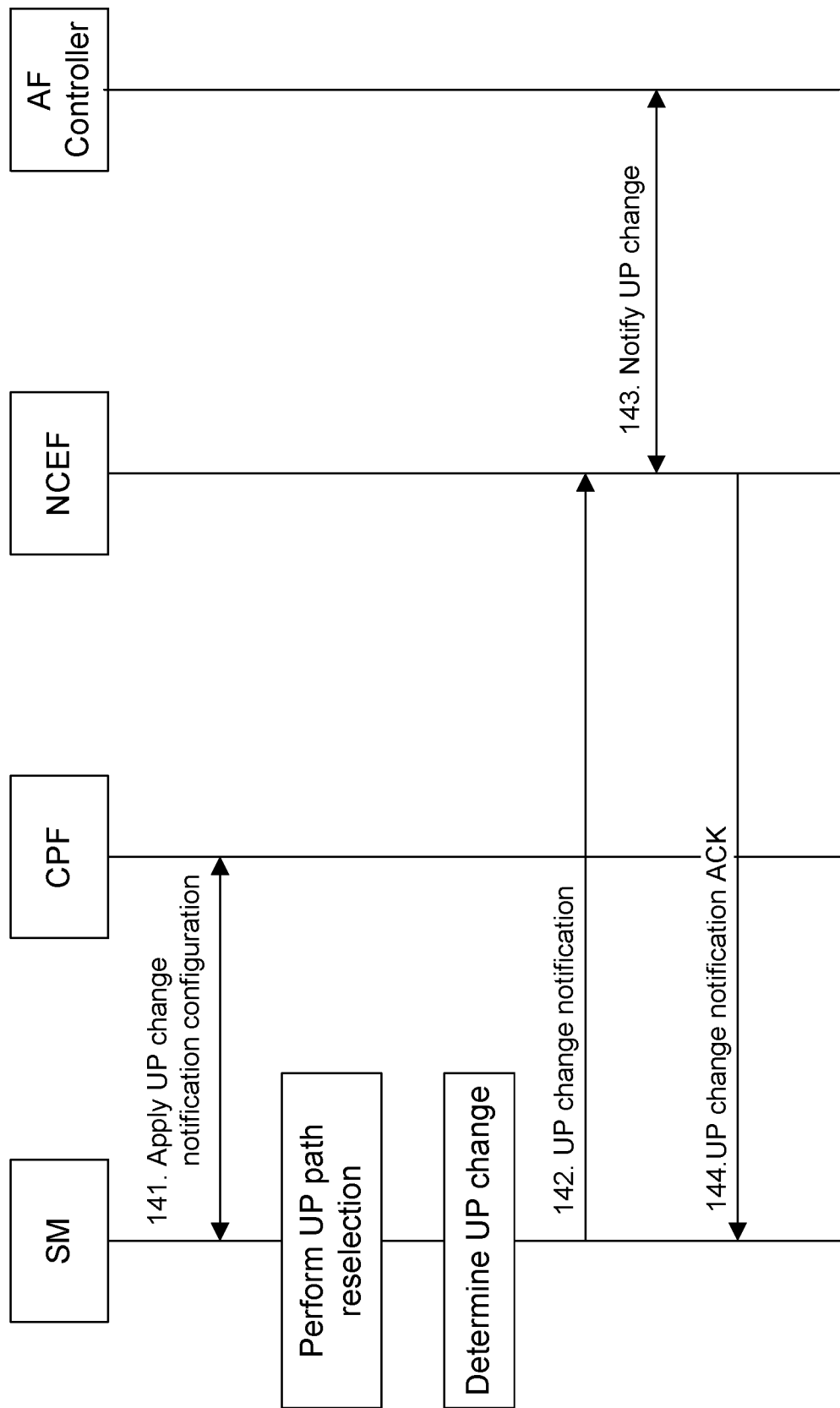
FIG. 6D is a call flow diagram illustrating a method for notifying network elements of UP changes, according to another embodiment.

FIG. 6D a call flow diagram illustrating a method for notifying network elements of UP changes, according to another embodiment. For example, after an SM function has applied a configuration specifying how to generate notification of UP changes, the method shown in FIG. 6D may be used to notify an AF controller or NCEF function of the UP changes. The UP changes may related to changes in a UP path to allow for notification of reconfiguration/re-routing of incoming packets to appropriately arrive to their next logical network destination (e.g. UP gateway) in view of UP path changes. According to embodiments, a logical network destination may be defined by a UP landmark which can be an identifier associated with a particular location or point within the user plane or the network. For example a UP landmark can be an identifier associated with an access location associated with a data network, which may be considered a data network access identifier (DNAI) or other identifier. The method of FIG. 6D may be applied to the network of FIG. 6A, in certain embodiments. In step 141, the SM function applies a UP change configuration. This may comprise a similar procedure to that of step 136 shown in FIG. 6C, for example, and may also occur during a session or session setup (initialization) time. As would be understood by applying the UP change configuration, the SM or SMF is applying UP path selection or reselection policy. As shown in FIG. 6D, this may comprise performing a UP path reselection, and determining UP changes. If the SM determines UP changes (such as UP gateway changes) as a result of UP path reselection, the SM at step 142, sends a UP gateway change notification to the NCEF function. In step 143, the NCEF function notifies the AF controller of UP changes. The message may include the IP address of the new UP gateway, for example. Finally in step 144, the NCEF function sends an acknowledgement to the SM function, for example, regarding acceptance of the notification.

According to embodiments, an application system (AS) is composed of one or multiple application functions, wherein such AS may be deployed inside the operator's network, closer to the edge while operating outside of the 3GPP domain. According to embodiments, the internal components of an in-network AS may be "invisible" to entities that are outside of the network domain, for example outside the 3GPP and/or AS domain. In this configuration, the AS is presented to a UE as a single entity, for example the AS may be assigned a single virtual IP address and offers a particular service or services to the UE. Accordingly, a UE uses this virtual IP address to access one or more of the services offered by the AS.

According to embodiments, for certain traffic conditions, AS (re)location or (re)selection may happen from time to time. For example, a data aggregation function may be deployed closer to a plurality of utility meter devices in order to aggregate raw meter readings into a compact form before forwarding this data over the network to the operation centre. For example, meter readings can generally be pre-scheduled and the device transmission schedule is known in advance. In order to balance the traffic load on a network, AS (re)location can be planned according to the transmission schedule. Another example of potentially requiring AS (re)location can be for network caching. In this example, content caching functions can be deployed in the network for a content service provider. As a UE moves, a different caching function may be selected for the UE to reduce content delivery delay and delivery cost. A further example relates to critical communications, where UE mobility may result in a changing set of User Plane Gateways (UP-GW) (for providing parallel connections or multiple PDU sessions or multi-homing connections) together with one or multiple AS locations selected for the UE traffic in order to achieve a desired level of reliability and QoS.

According to embodiments, when AS relocation happens, a UP path may be reselected so as to provide a desired end-to-end QoS and efficiency. In some instances, UP path reselection can be triggered by 3GPP internal factors such as UE mobility and load balancing, wherein this may result in a current AS location being determined to be suboptimal and result in a trigger for AS relocation. However, since the 3GPP network and the AS network are managed separately, interaction is needed between the two networks for ensuring end-to-end performance and efficiency.

Figure 7:
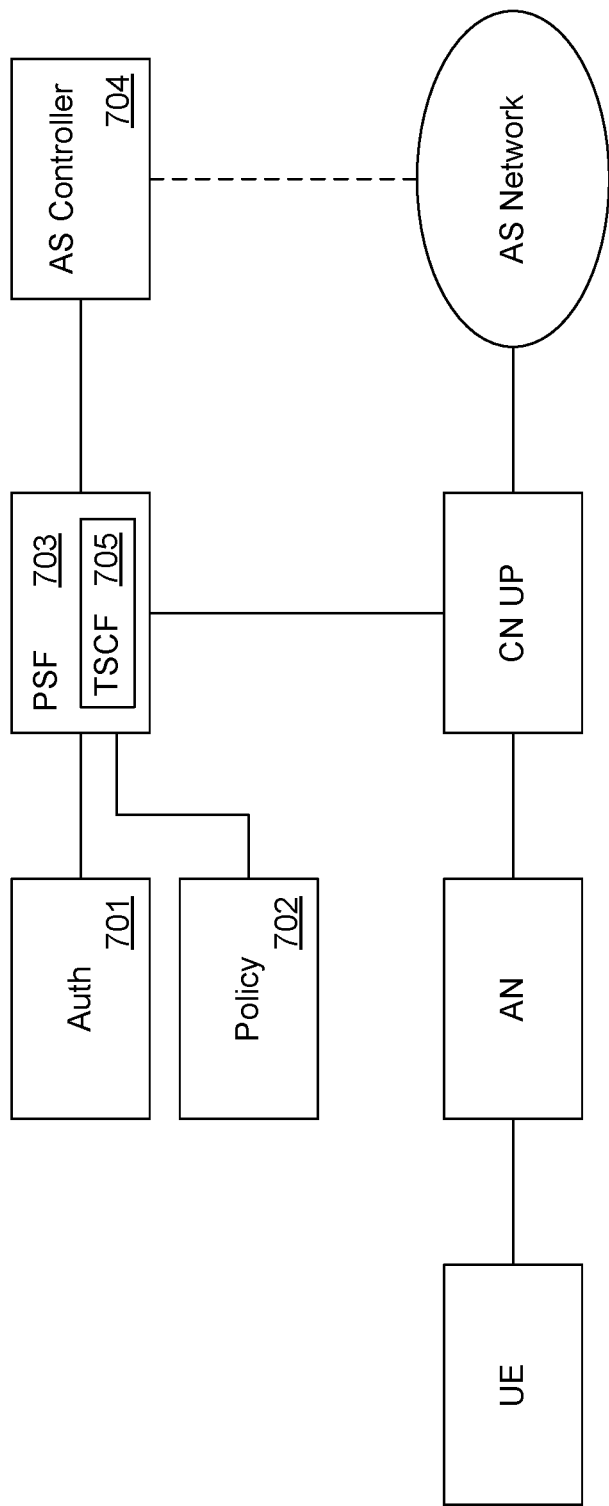
FIG. 7 is a logical schematic of a communications network, according to another embodiment.

FIG. 7 is a logical schematic of a communications network, according to another embodiment. In the embodiment illustrated in FIG. 7, application-aware UP path (re)selection is carried out in the Control Plane by a path selection function (PSF), an authentication function (Auth) and a policy control function (Policy).

In this embodiment, the Auth function 701 is responsible for authenticating a UP path (re)selection request, while the Policy function 702 provides information necessary for validation and authorization of this request. In some embodiments, the PSF performs 703 UP path (re)selection and in some embodiments, the PSF performs validation and authorization of this (re)selection by verifying the UP path (re)selection request from the AS controller 704 with respect to one or more pre-defined policies. In some embodiments, the policies can be dynamically updated as required, and in some embodiments, the policies may be application or session specific. For example, if the session and service continuity (SSC) mode of an ongoing session indicates that no UP GW change can happen, a UP path (re)selection request concerning that session can be regarded invalid and rejected.

In some embodiments, the PSF function includes a traffic steering control function (TSCF) 705 as a sub function. The PSF can provide the configuring of the traffic steering behaviour in the UP. In some embodiments, the PSF may be a separate CP function or be part of an existing CP function, e.g. Session Management function (SM) or Policy function.

As illustrated in FIG. 7, the TSCF is illustrated as being integrated within the PSF for simplification. However, in other embodiments, the TSCF is part of another CP function or configured as a separate CP function. In embodiments where the TSCF is not within the PSF, the interaction between the TSCF and the PSF can be defined.

According to embodiments, a potential SSC issue between the 3GPP domain and the AS domain can occur as a result of UP reselection or AS relocation. The potential SSC problem can be overcome by ensuring traffic delivery toward correct UP GW (in the Down Link case) or to the correct AS location (in the Uplink Link case).

Embodiments of the present invention do not require the UE's involvement. To further illustrate, assume the UE has a single IP address (constant) and uses different ports for different PDU sessions. The network is assumed to be aware of both the UE's address and the port number. The port number may be generated by the network or by the UE. In the latter case, the UE may be required to inform the network of the port number. The port number can be included in the session request or after session setup is complete through a separate CP signalling. Note that the potential SSC issue mentioned above does not arise during initial UP GW selection but only during the UP GW reselection where it is necessary to preserve the initially assigned IP address and port number.

According to embodiments, the UP GW implements a traffic steering function with a functionality that is similar to network address translation (NAT). Traffic steering can be provided by network address translation applied to the destination address and the destination port, for example translating the raw address and/or raw port into a different address and/or a different port. For example, traffic steering can change the identifier associated with a particular location or point within the user plane. The identifier can be associated with an access location associated with a data network, which may be considered a data network access identifier (DNAI) or other identifier. According to embodiments, differentiated traffic steering may be achieved by applying different translation procedures according to different source address, source port, destination address, destination port, traffic type, and/or Differentiated Services Code Point (DSCP), and the like. According to embodiments, the traffic steering function operates according to rules defined by the TSCF.

Figure 8A:
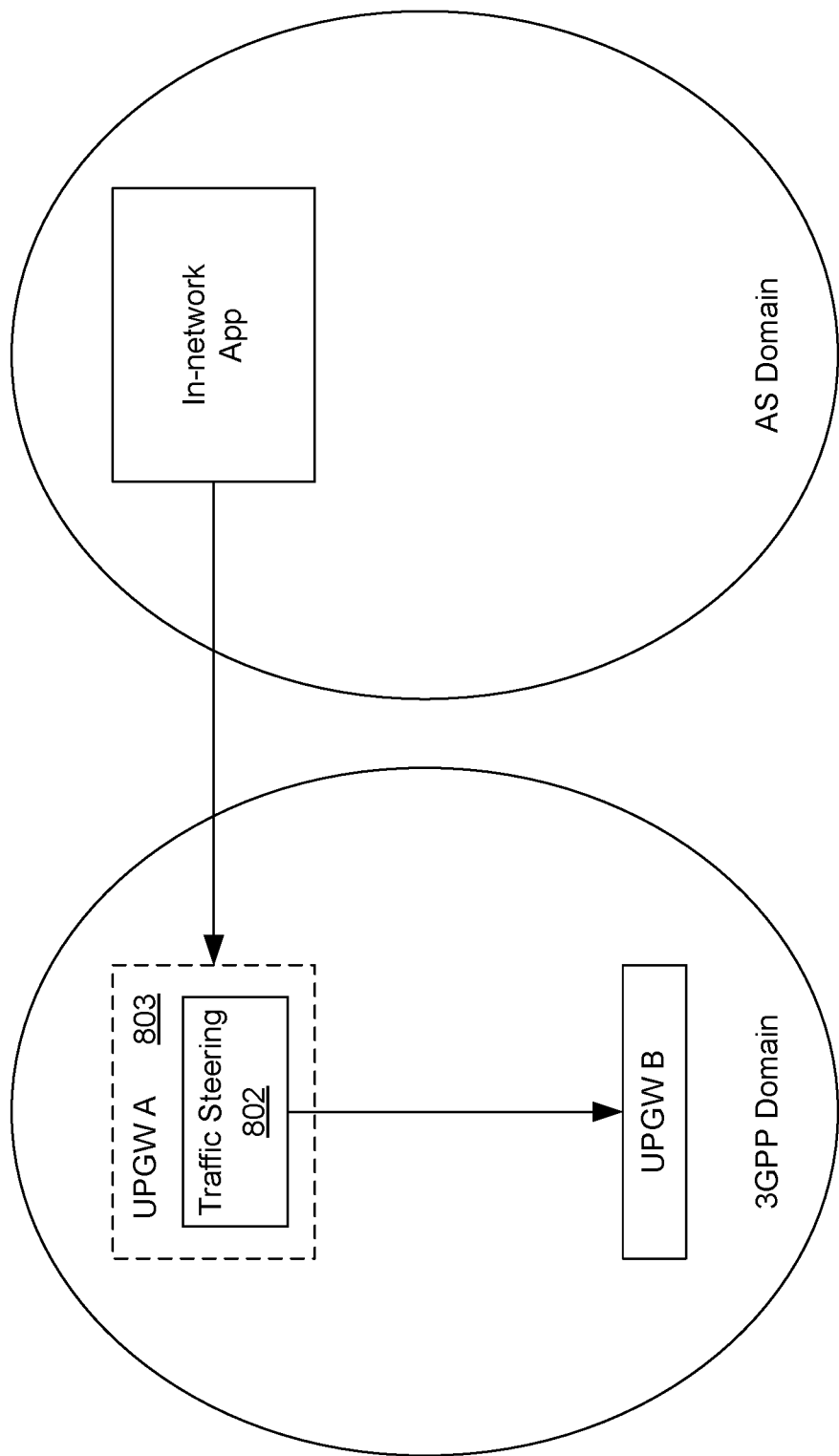
FIG. 8A is a schematic diagram illustrating traffic steering located at the UP GW for downlink traffic after UP reselection, according to an embodiment.
Figure 8B:
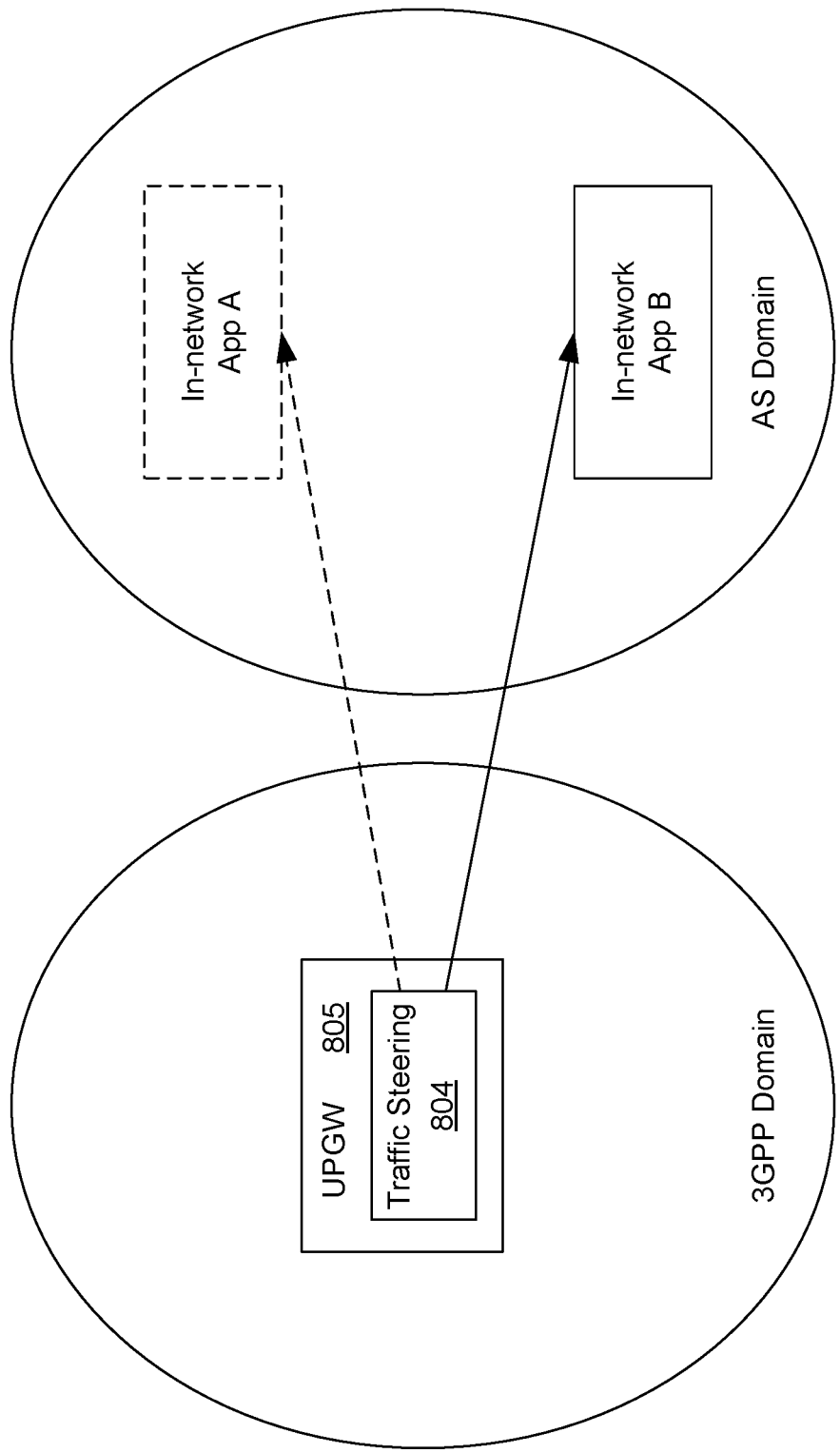
FIG. 8B is a schematic diagram illustrating traffic steering located at the UP GW for uplink traffic after AS relocation, according to an embodiment.

With properly configured traffic steering rules the UP GW is able to redirect DL traffic to a new UP GW after UP reselection and UL traffic to new AS location after AS relocation. According to this embodiment, FIG. 8A illustrates a schematic diagram showing traffic steering 802 located at the UP GW 803 for downlink traffic after UP reselection and FIG. 8B illustrates a schematic diagram showing traffic steering 804 located at the UP GW 805 for uplink traffic after AS relocation.

Figure 8C:
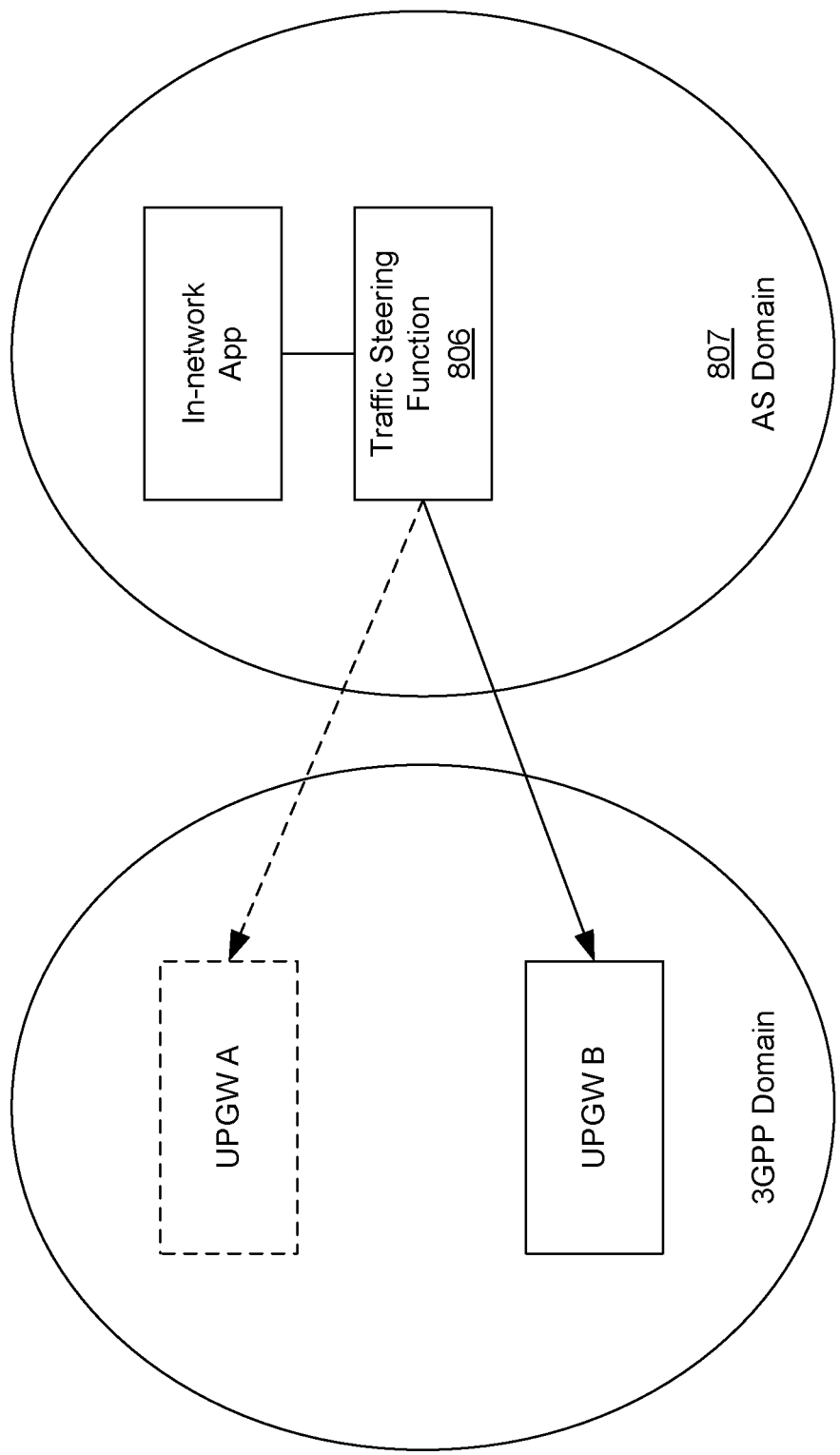
FIG. 8C is a schematic diagram illustrating traffic steering located in the AS network for downlink traffic after UP reselection, according to an embodiment.
Figure 8D:
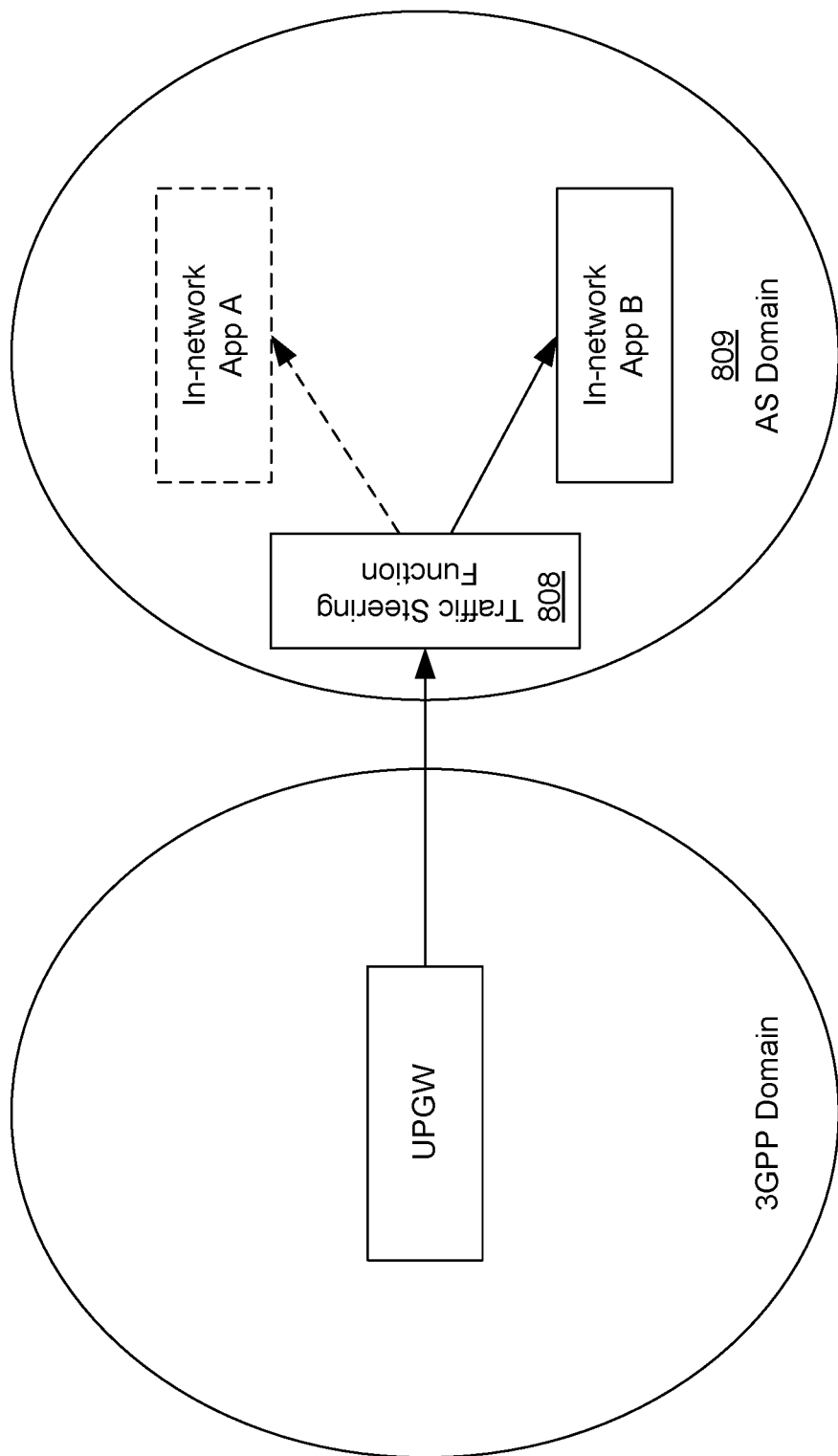
FIG. 8D is a schematic diagram illustrating traffic steering located in the AS network for uplink traffic after AS relocation, according to an embodiment.

According to another embodiment, a traffic steering function is deployed in the AS domain and configured by the AS controller. This embodiment can apply when UP GW is a virtual function instantiated in a data centre (DC) and the corresponding traffic steering function can be deployed in the DC's network gateway. It is recognized that this solution is out of the scope of 3GPP because the traffic steering function is located inside the AS domain. However, for this embodiments, the 3GPP domain needs to indicate the associated traffic when notifying the AS controller about UP change or setup. It is recognized that this embodiment is more relevant to the downlink case. According to embodiments, a reference number or a traffic identifier number (e.g. a combination of address and port of the UE) can be included in the notification. As would be readily understood a traffic identifier number or traffic identifier, may be one or a combination of address of the UE and port of the UE. The reference number can be provided to the AS controller as part of the UP path (re)selection response or the UP setup (change) notification response. The AS controller can identify the corresponding UP path (re)selection or UP setup (change) notification request using the reference number and extract the UE filter information. According the UE filtering information or the traffic identifier and the notified UP GW location, the AS controller can configure the traffic steering function positioned in the AS domain. According to this embodiment, FIG. 8C is a schematic diagram illustrating traffic steering 806 located in the AS network 807 for downlink traffic after UP reselection and FIG. 8D is a schematic diagram illustrating traffic steering 808 located in the AS network 809 for uplink traffic after AS relocation. According to embodiments, the traffic steering function can be identified by a UP landmark, for example the UP landmark can define the location of traffic steering function within the data network. In addition, a request for UP selection or reselection can indicate the UP landmark indentifying the location of a traffic steering function that should be respected during UP path selection or re-selection.

Embodiments of the present invention may relate to a variation of a procedure as described in Section 6.5.5 of the document: 3GPP TR 23.799, "Study on Architecture for Next Generation System," 3$^{rd}$ Generation Partnership Project, Version 0.6.0, July, 2016.

Referring back to FIG. 7, UP path (re)selection is performed by Control Plane functions, including a Path Selection Function (PSF), an Authentication Function (Auth) and a Policy Control Function (Policy), and an AS controller (which is a non-3GPP function) that is in configured to manage AS (re)selection/(re)location. With reference to FIG. 7, the communication interfaces marked by dashed lines are out of the scope of 3GPP, for example the communication interface between the AS controller and the AS network.

According to embodiments, the AS controller is a function under the control of the operator and within the trusted domain. According to embodiments, it is assumed that the AS controller has a certain knowledge of the topology of the Core Network User plane with respect to the AS network. According to embodiments, the PSF is part of a Control Plane function, for example the Session Management function (SM).

Figure 9:
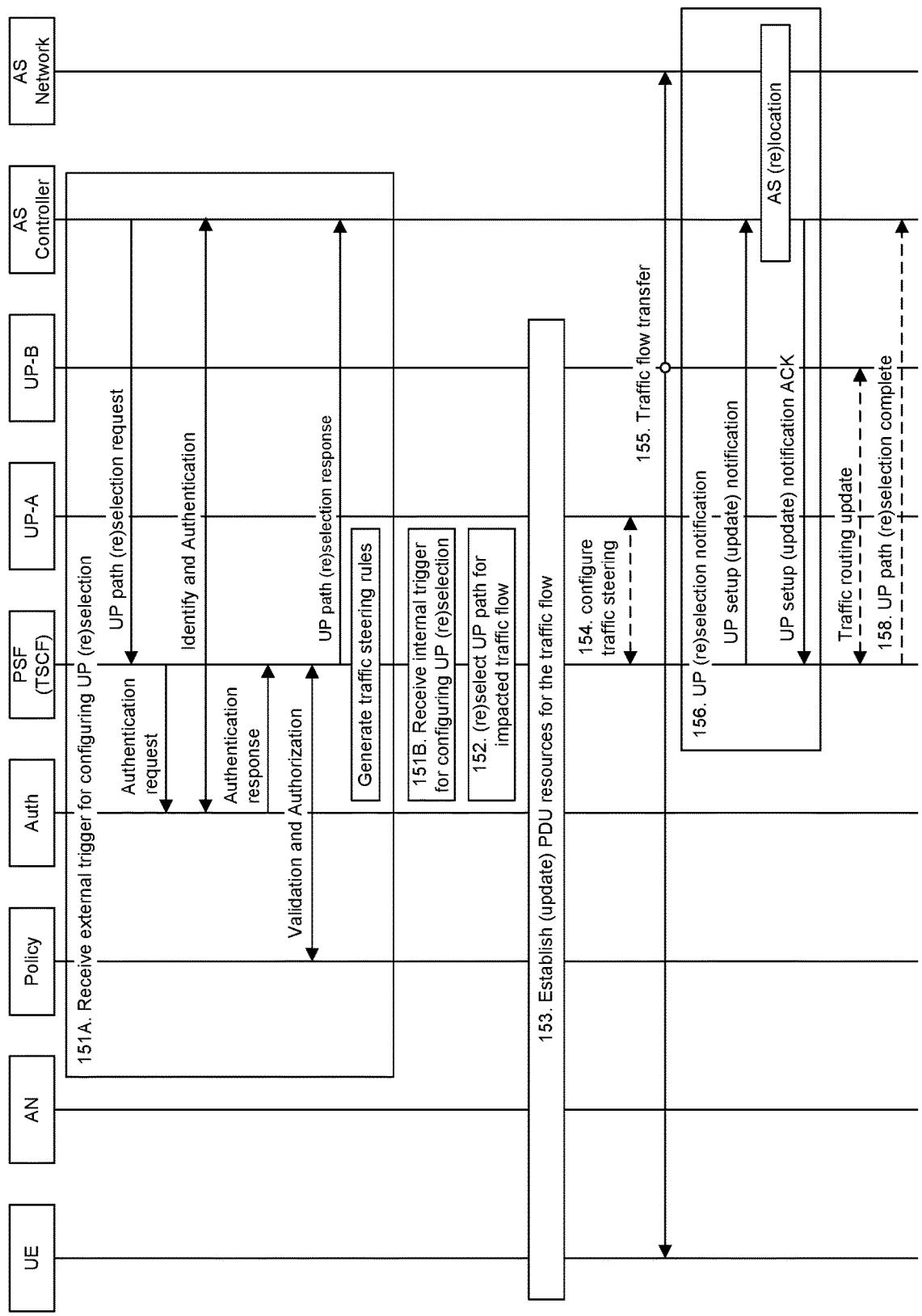
FIG. 9 is a call flow diagram illustrating a method for application-aware UP path (re)selection.

FIG. 9 is a call flow diagram illustrating a method for enabling application awareness for UP path (re)selection according to embodiments of the present invention. As illustrated, the PSF receives a UP path (re)selection Request for the protocol data unit (PDU) session associated with the application. This request can be received from outside of the 3GPP network, for example from the AS controller as illustrated by 151A in FIG. 9. Alternately, the request can be received from inside the 3GPP network, for example the request can be a result of mobility and/or load balancing as illustrated by 151B in FIG. 9.

In the embodiments where the request is received from outside the 3GPP network, a sequence of steps in a call flow are illustrated in the box identified as 151A. Initially the AS controller sends a UP path (re)selection request. In some embodiments, the request includes an application identifier that indicates the application for which the requested UP path (re)selection is applied. In some embodiments, the request includes UE filter information that indicates the UE for which the requested UP path (re)selection is applied.

In some embodiments, a universal UE attribute set can be pre-defined, for example, including subscriber ID, device type, MAC address, geographic location, remaining energy, or the like. In some embodiments, the UE filter is defined with respect to UE attributes. In some embodiments, the UE filter additionally depends on intended application (for example identified by address and port), traffic type, DSCP, or the like. As noted above, a UE filter is defined with respect to UE attributes or UE information or UE filter information, which can provide for the configuration of a UE filter, for example a traffic filter.

In some embodiments, the request includes a list of UP functions and AS locations suitable and/or unsuitable for selection, to be taken in account during UP path (re)selection. According to embodiments, the network functions within the communications network, for example the CPF, can be configured to identify AS locations or application locations that are suitable for selection or unsuitable for selection. Each AS location and application location may have associated therewith a UP landmark, which as previously discussed can be an identifier associated with a particular location or point within the user plane. For example a UP landmark can be an identifier associated with an access location associated with a data network, which may be considered a data network access identifier (DNAI) or other identifier. The UP functions and AS locations may be specified using network addresses such as IP address, MAC address, or other type of addresses. In some embodiments, the request includes time intervals indicating when the requested UP path (re)selection should be applied. In some embodiments, the request includes AS relocation capability/possibility for the PDU session associated with the application. In some embodiments, the request includes AS-side traffic steering capability. In some embodiments, the request indicates whether to wait for a confirmation from the AS controller before moving traffic to the new UP. It would be readily understood, that the request includes data indicative of one or more of the above identified features.

In these embodiments, a single UE is connected to the AS, however, according to embodiments, an AS can serve a number of UEs simultaneously, which can result in the UP paths of PDU sessions of multiple UEs being reselected.

With further reference to FIG. 9, according to embodiments, subsequent to receiving the request, the PSF sends an authentication request to the Auth function to trigger authentication. The Auth function obtains the identity of the AS controller and performs authentication. The Auth function then provides the authentication result to the PSF through a response message. In the case of authentication failure, the remainder of operations in box 151A are skipped.

However, when the authentication result is valid, the PSF interacts with the Policy function to validate and authorize the UP path (re)selection request. If the UE already has a pre-established session, the result of this step could be either: (1) rejection; (2) acceptance; or (3) partial acceptance. For SSC mode 1, it is rejection; however traffic steering may be adjusted to route traffic towards the new AS location. For SSC mode 2, it is acceptance; for SSC mode 3 it is partial acceptance.

The PSF then sends a UP path (re)selection response to the AS controller, wherein the message indicates whether the request has been accepted or rejected. In some embodiments, if the request is rejected, the message sent to the AS controller can further include the cause of the rejection, which may be conveyed to the AS controller in the form of an error code, and in the case of rejection of the request the process terminates. If the request is accepted, the message to the AS controller can include a reference number. The PSF may subsequently generate traffic steering rules and notifies the TSCF about the rules.

In some embodiments, the AS controller communicates with the PSF directly, and in other embodiments the AS controller communicates with the PSF via the service capability exposure function (SCEF), which is also referred to as network capability exposure function (NCEF). In some embodiments, if the communication between the AS controller and the PSF is via the SCEF, the SCEF may be configured to perform one or more of the authentication, validation and authorization, and traffic steering rule generation.

According to embodiments, upon completion of the steps defined above with respect to receiving the request from outside the 3GPP network (151A) or from inside the 3GPP network (151B), the PSF identifies the PDU session or sessions that will be impacted by the (re)selection. In the case of a new session, the PSF can determine the SSC mode according to the AS relocation capability/possibility provided within the request. For example, if it is indicated that AS controller is not capable of performing AS relocation for the PDU session or sessions, the selected SSC mode for the PDU session or sessions may be SSC mode 1.

According to embodiments, the PSF (re)selects 152 UP for the impacted traffic flow according to the list of UP functions and AS locations specified as being suitable or unsuitable for selection in the request. The PSF can establish 153 PDU resources in the case of UP selection or update the PDU session resources to change the traffic flow path from UP-A to UP-B in the case of UP reselection. The PSF can handle intra-3GPP SSC during this process.

The TSCF configures 154 the traffic steering rules at UP-A in the case of SSC mode 2 so that remaining DL traffic can be redirected to UP-B. It is not necessary in the case of UP reselection with SSC mode 3 and UP selection.

In some embodiments, the TSCF may configure traffic steering at one or more selected UP functions. The traffic steering is configured for directing traffic toward the proper next UP function(s) or toward the proper PDNs (packet data networks), local networks or AS networks. In some embodiments, the TSCF may configure traffic to be split among multiple next-hop UP functions or multiple target networks (PDNs and/or local networks such as AS networks). In some embodiments, the TSCF may configure traffic to be transmitted in parallel and/or in a multicast manner to multiple next-hop UP functions and/or multiple target networks. For example, the traffic transmitted to a first next hop may overlap in content with the traffic transmitted to a second next hop. When the content transmitted to the first and second next hops overlaps 100%, the transmission may be performed via a multicast. When the content transmitted to the first and second next hops does not overlap at all, the transmissions may comprise two different, parallel transmissions. When content transmitted to the first and second hops partially overlaps, a combination of parallel transmissions and multicast transmissions may be used to convey the content to the next hops. Traffic which is not transmitted via multicast (if any) may be transmitted in a unicast manner to a selected next-hop UP function or target network. The TSCF may configure traffic steering in UP at select UP functions to achieve different steering cases.

Subsequently traffic flow is delivered though UP-B, however in some embodiments, this step may be delayed until the full end-to-end path becomes ready. This delay in the delivery of the traffic flow can be predefined by the AS controller when it send the UP path (re)selection request. In this case, the configuration of traffic steering rules by the TSCF may also be delayed.

According to embodiments, in instances where the PSF determines the UP gateway for session setup or the PSF determines the new UP gateway for an active PDU session due to UP path reselection and the AS controller has sent 156 a notification of a need of setup or change of the UP, the PSF initiates the UP setup or change notification procedure. This notification procedure can include notifying the AS controller of the UP setup or change of a PDU session associated with an AS. The notification may include the UP GW location a traffic identifier, or a reference number. In the case SSC mode 2, the notification may include a reference number. The AS controller can identify the UP path (re) selection or UP setup (change) notification request using the reference number and extract the UE filter information. Based on the UE filtering information and the UP GW location, the AS controller may configure the traffic steering function. In the case of SSC mode 3, the notification may include a traffic identifier so that the AS controller can identify the portion of the traffic that should be configured without impacting ongoing session to the UE. The traffic identifier may be, for example, a combination of address and port of UE used for the traffic. As would be readily understood, a traffic identifier may be one or more of an address of the UE and a port of the UE.

The AS controller can subsequently perform a sequence of steps for the AS (re)location or AS state (re)location procedure. In some embodiments, the AS controller also performs traffic steering configuration to provide service and session continuity. Subsequently, the AS controller sends and acknowledgement to the PSF which can relate to the acceptance of the notification. The acknowledgement may further include an SSC indicator, which may imply whether SSC has been maintained from the AS side. In some embodiments, the AS controller sends a different SSC indicator for a DL session when compared to an UL session which are performed between the same UE and AS location.

According to embodiments, if the SSC is not maintained from the AS side as indicated at the end of the notification procedure, the PSF updates the UP to setup the steering of the traffic between the new UP and the new AS serving the UE. In some embodiments, traffic steering is provided by network address translation applied to destination address and destination port and differentiated traffic steering may be achieved by applying different translation according to different source address, source port, traffic type, and/or Differentiated Services Code Point (DSCP) or the like.

According to embodiments, the PSF subsequently notifies 158 the AS controller that the UP path (re)selection is complete. In some embodiments, this notification may trigger the AS controller to finalize AS relocation resulting in the release of resources and cleaning up of data structures.

In various embodiments, a UP GW is a UP function through which the UP is connected to a non-3GPP domain, such as an AS network or a PDN (packet data network). In some embodiments, a first UP (UP A) may be sub-UP of another UP (UP B), and the GW of UP A may be a UP function in UP B that defines the sub-UP. In summary, depending on the type of UP, a UP GW may be an IP anchor, a mobility anchor, a branching function, a local breakout point, or another UP function.

Figure 10A:
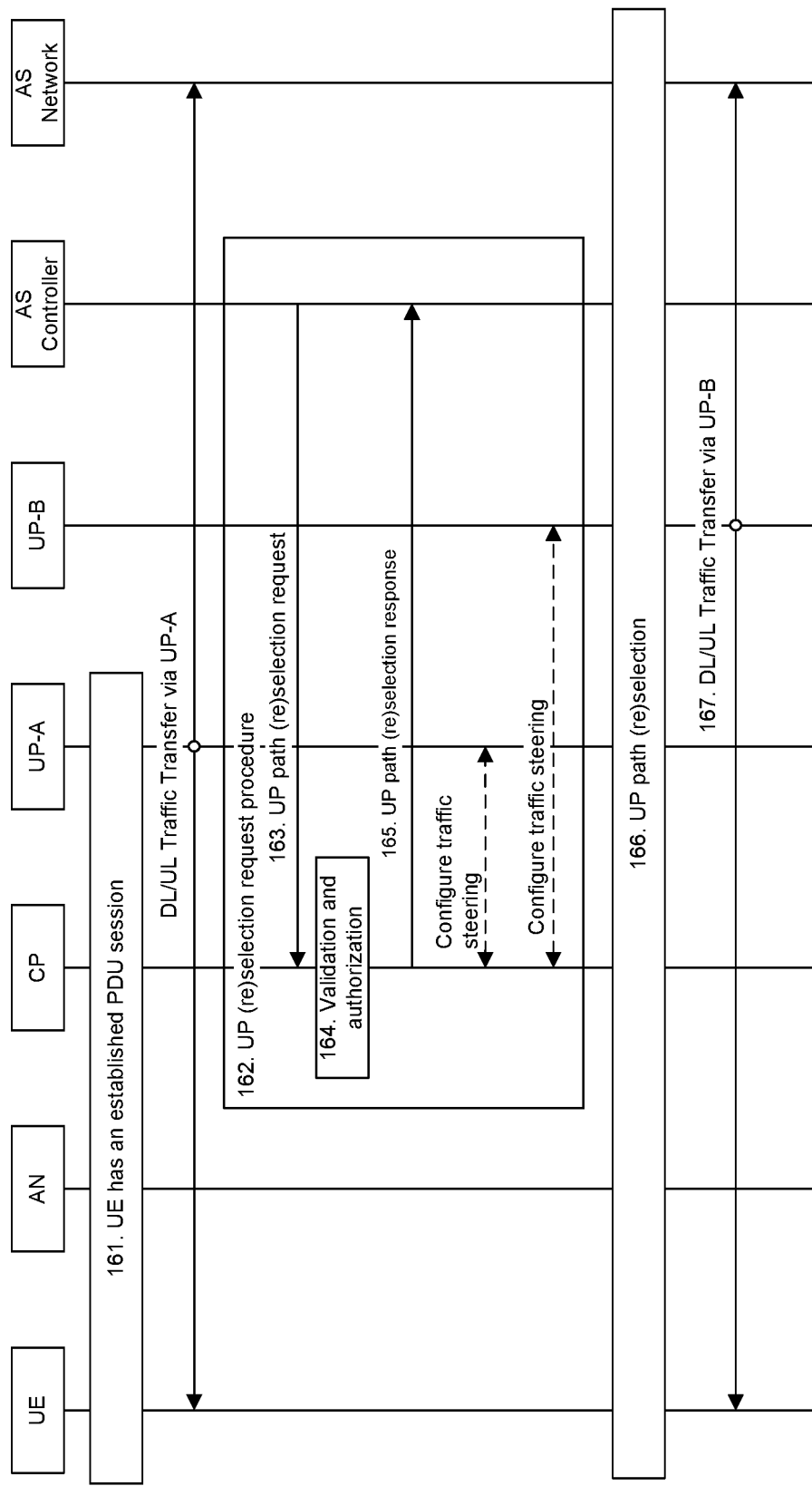
FIG. 10A is a flow diagram describing a procedure for enabling application-awareness to UP path (re)selection according to an embodiment of the present invention.

FIG. 10A is a flow diagram describing a procedure for enabling application-awareness for UP path (re)selection according to another embodiment of the present invention.

The flow diagram of FIG. 10A is described in more detail below. Initially, a UE has an established PDU session 161 with the application via UP_A and DL/UL traffic associated with the session has started to flow.

Next, a UE (re)selection request procedure 162 takes place upon receiving a request from the AS controller. In more detail, the Control Plane receives a UP path (re) selection request 163 for the PDU session associated with the application. The request may include an application identifier that indicates the application for which the requested UP path (re)selection is applied. The request may include UE filter information that indicates the UE for which the requested UP path (re)selection is applied. It is noted that a universal UE attribute set may be pre-defined, for example, including subscriber ID, device type, MAC address, geographic location, remaining energy, etc. The UE filter may be defined with respect to UE attributes. It may additionally depend on intended application (address and port), traffic type, DSCP (i.e. differentiated services code point), etc. It is also noted that the present procedure describes the case where a single UE is connected to the AS; however, an AS can serve a number of UEs simultaneously, and in some embodiments this may result in the UP paths of PDU sessions of multiple UEs being reselected.

Further, the request may include a list of UP functions and AS locations suitable and/or unsuitable for selection, to be taken in account during UP path (re)selection. The UP functions may be specified using network addresses such as an IP address, a MAC address, or another type of address. The request may include time intervals indicating when the requested UP path (re)selection should be applied. The request may include AS traffic steering capability for the PDU session associated with the application. The AS controller may communicate with the Control Plane directly or via the SCEF.

Following receipt of the request, the control plane performs validation and authorization 164 for the UP path (re)selection request. Other security measure such as authentication can also be carried out at this step.

Next, the Control Plane transmits a response 165 back to the AS controller, acknowledging the acceptance of the requested UP path (re)selection or its rejection. For SSC mode 1, the response is a rejection; however traffic steering may be adjusted to route traffic towards the new AS location; for SSC mode 2, the response may be an acceptance; for SSC mode 3 the response may be a partial acceptance, implying UP path (re)selection will be performed for new application sessions but not the on-going ones. In the case of rejection, the message may include an error code indicating the cause. In the case of acceptance (partial or full), the message may include a reference number.

Next, the CP optionally generates traffic steering rules according to the UP (re)selection request and configures the rules into UP GWs.

Next, the Control Plane identifies the impacted PDU session, (re)selects 166 the UP for the traffic flow according to the application location, and establishes PDU resources in the case of UP selection or updates the PDU session resource to change the traffic flow path from the UP-A to UP-B in the case of UP reselection.

Next, DL/UL traffic is transferred 167 through UP-B and/or UP-A.

Figure 10B:
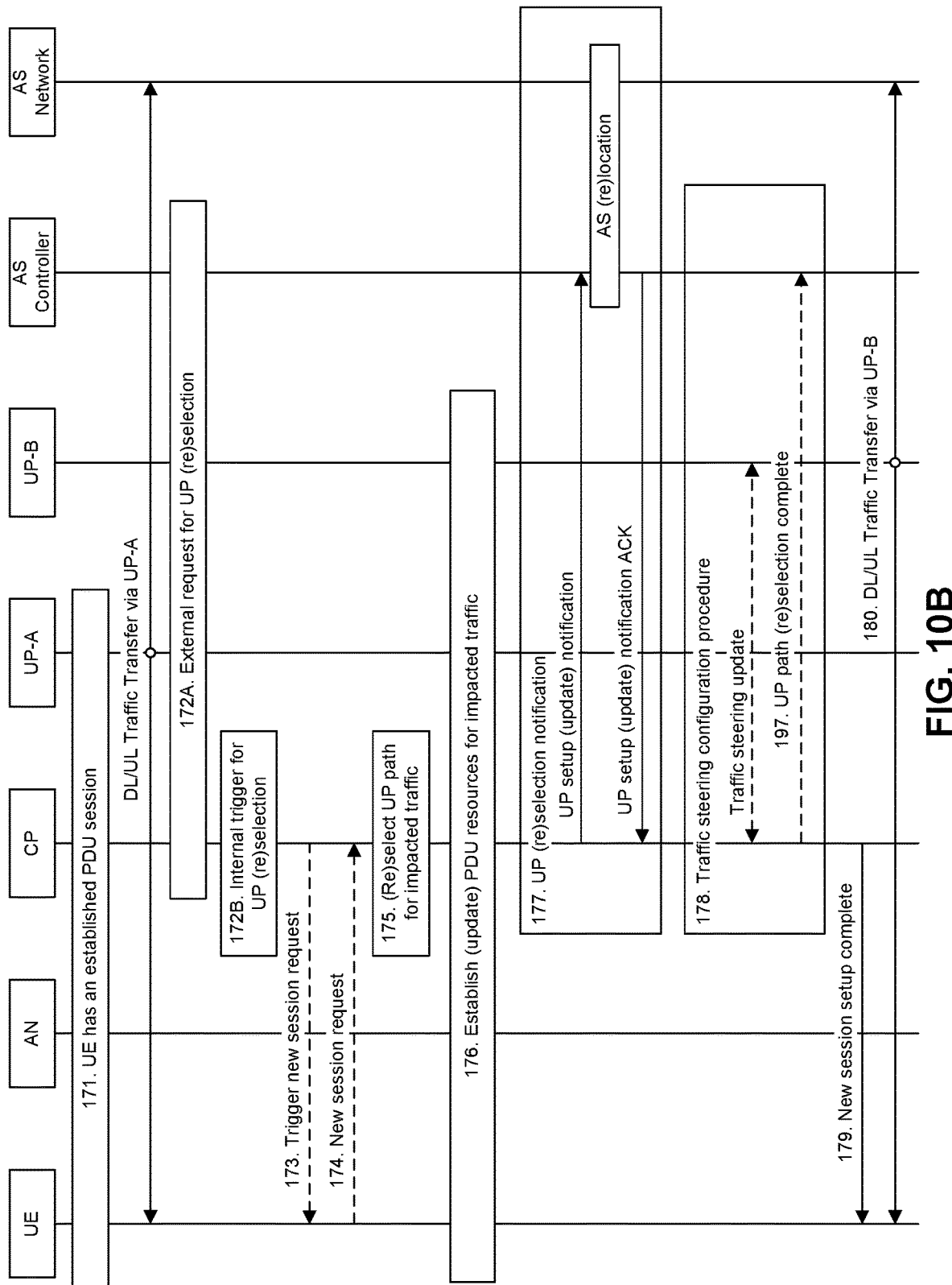
FIG. 10B is a flow diagram describing a procedure for UP path (re)selection in detail, including UP change notification and traffic steering configuration, according to an embodiment of the invention.

FIG. 10B is a flow diagram describing a procedure for UP path (re)selection in detail, including UP change notification and traffic steering configuration, according to another embodiment of the invention, for example in conjunction with FIG. 10A. The steps 173-179 in FIG. 10B correspond to the step 166 in FIG. 10A. The flow diagram of FIG. 10B is described in more detail below.

According to embodiments, a UP change implies a change in user plane, for example a user plane function (UPF) selection, UPF reselection, application location selection, application location reselection. As would be understood, when application location is represented by UP landmark, for example a DNAI, a UP change would also include a DNAI change. However if a UPF remains unchanged, a UP landmark associated therewith, for example a DNAI, may change. This potential change in the DNAI may be a result of reselection of application location for example.

Initially, a UE has established a PDU session 171 with the application via UP_A and DL/UL traffic associated with the session has started to flow.

Next, the CP receives a UP (re)selection trigger. In a first case, denoted in FIG. 10B as (172A) a request from the AS controller. In a second case, denoted in FIG. 10B as (172B), an internal triggering event such as UE mobility or load balancing.

Next, the CP triggers the UE 173 to stop using the ongoing PDU session for new application sessions if the ongoing PDU session is of SSC mode 3, or redirecting the application sessions in the ongoing PDU session to a new session if the ongoing session is of SSC mode 2. This step may require UE involvement for redirecting traffic to a different PDU session. Alternatively, the network may perform the required traffic redirection.

Next, the UE sends a new session request 174 spontaneously or as a result of the previous step (step 173 as illustrated in FIG. 10B).

Next, the CP identifies the impacted 175 PDU session and (re)selects the UP for the traffic flow.

Next, the CP establishes PDU resources 176 in the case of UP selection or updates the PDU session resource to change the traffic flow path from the UP-A to UP-B in the case of UP reselection. The CP may also configure DL traffic forwarding from UP-A to UP-B for any leftover traffic.

When the Control Plane determines the UP gateway during session setup or when the Control Plane determines the new UP gateway for the PDU session as a result of UP path reselection, the Control Plane initiates a UP (re)selection notification procedure 177: First, the CP notifies the UP setup or change of a PDU session associated to an AS to the AS controller. In the case of SSC mode 2, the notification may include a reference number corresponding to the previous UP path (re)selection request. In the case SSC mode 3, the notification may include a finer-level traffic identifier such as a combination of UE address and port number used for the application. Next, the AS controller performs the necessary steps for the AS (re)location or AS state (re)location procedure. The AS controller may also perform traffic steering configuration to ensure SSC. The details of AS (re)location and AS traffic steering configuration are out of 3GPP scope. Next, the AS controller acknowledges to the Control Plane about the acceptance of the notification. The acknowledgement may further include an SSC indicator, implying whether SSC has been maintained from the AS side.

Next, a traffic steering configuration procedure 178 takes place if the notification procedure indicates SSC is not maintained from the AS side. In some embodiments, a traffic steering configuration procedure takes place even if the SSC is maintained from the AS side. In the configuration procedure, the Control Plane updates the UP to setup the steering of the traffic between the new UP and the new AS serving the UE. This step is optional if traffic steering has been configured in step 2A of FIG. 10B. Next in the configuration procedure, the CP notifies the AS controller about the UP path (re)selection complete. The notification may trigger the AS controller to finalize AS relocation such as releasing resources and cleaning up data structures. The details of AS controller behavior are out of scope for 3GPP.

Next, the CP informs the UE about the completion of new session setup 179.

Next, the new session's traffic is transferred through UP-B 180. The ongoing session's traffic is kept being transferred through UP-A if the ongoing session has an SSC mode equal to 1 or 3 and through UP-B otherwise.

Figure 10C:
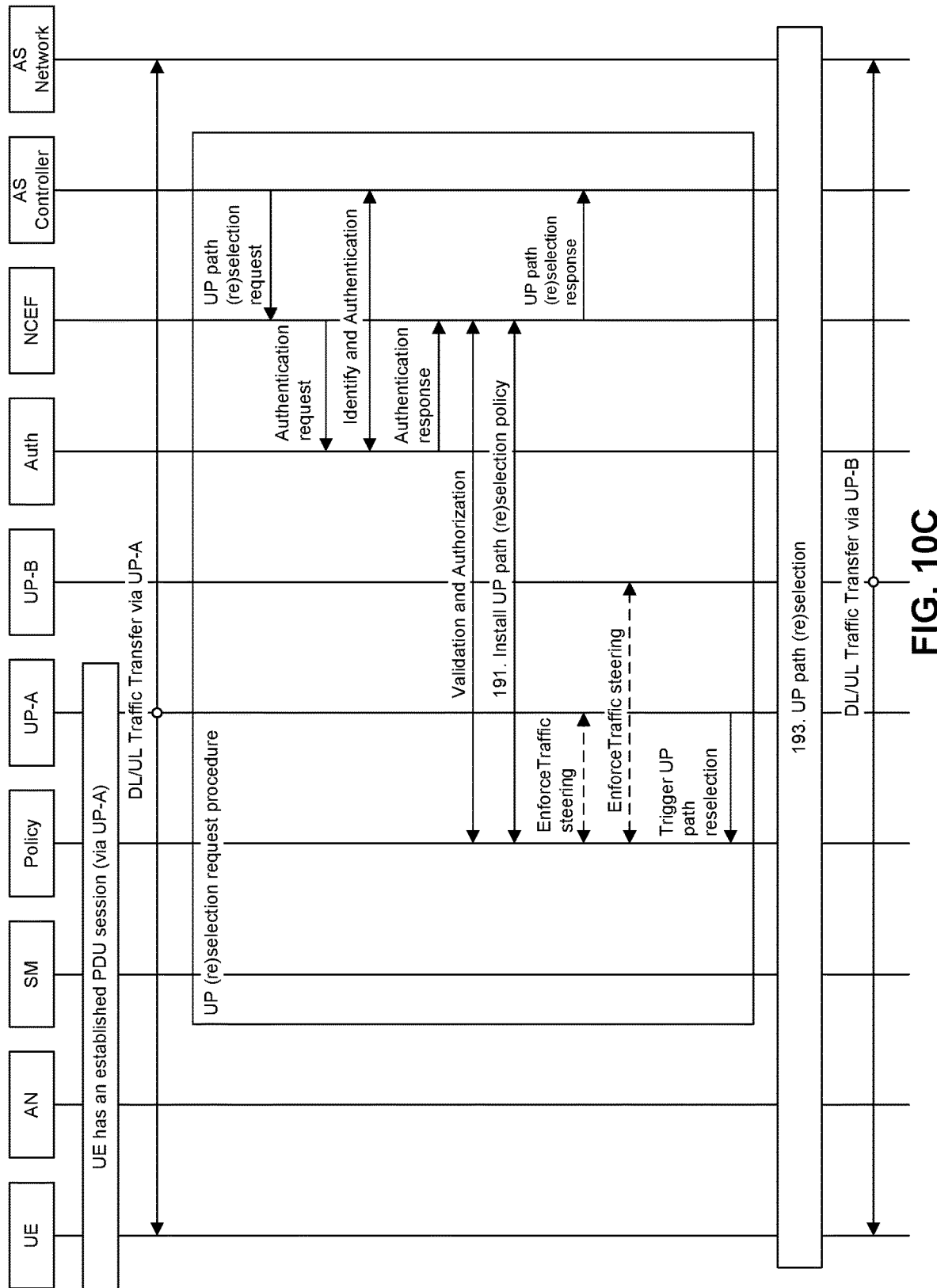
FIG. 10C is a flow diagram illustrating the operations of FIG. 10A in more detail, according to an embodiment of the present invention.

FIG. 10C is a flow diagram illustrating the operations of FIG. 10A in more detail, according to an embodiment of the present invention. For example, Step 191 of FIG. 10C informs the policy function regarding the UP path (re)selection policy. This may comprise providing the content of the UP path (re)selection request. Such content may indicate, for example, a UE filter, suitable or unsuitable UP functions for selection, suitable or unsuitable AS locations for selection, time interval, and an application identifier. Further, the SM consults with the policy function for UP path (re)selection policy and follows the policy in step 193 of FIG. 10C. This is shown in more detail in FIG. 10D as step 194.

Figure 10D:
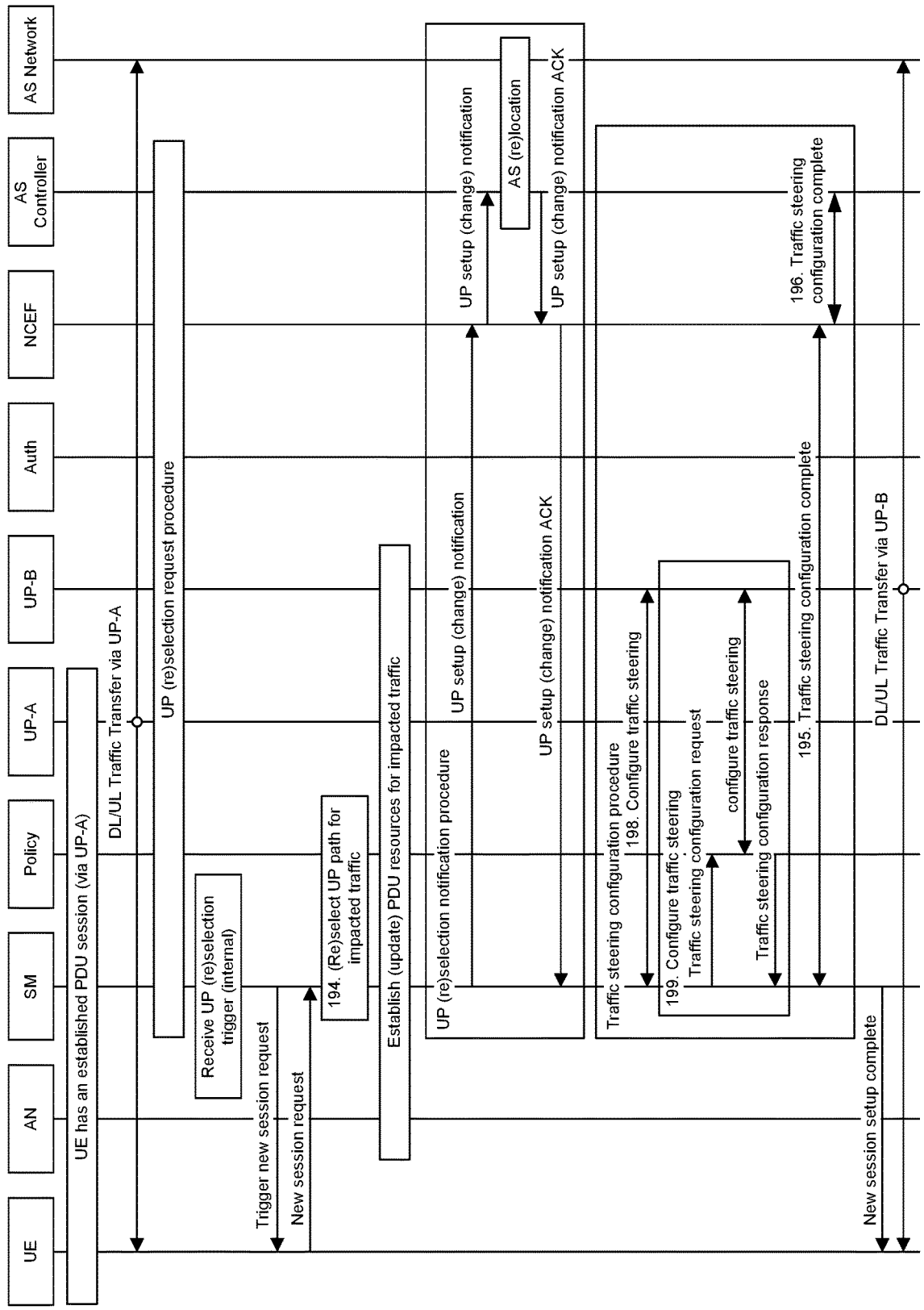
FIG. 10D is a flow diagram illustrating the operations of FIG. 10B in more detail, according to an embodiment of the present invention.

FIG. 10D is a flow diagram illustrating the operations of FIG. 10B in more detail, according to an embodiment of the present invention. It is noted, for example, that operations 195 and 196 of FIG. 10D are equivalent to operation 197 of FIG. 10B. The steps 198 and 199 show alternative implementations.

FIGS. 10C and 10D illustrate control plane functions which are omitted from FIGS. 10A and 10B, for example. In these figures, the Policy function and the SM function may both implement the TSCF, or only one of them implements the TSCF.

Accordingly, for example as described above with respect to FIGS. 10A to 10D, embodiments of the present invention comprise receiving a UP path change request, such as a path (re)selection request as discussed above. Embodiments of the present invention further comprise identifying a Protocol Data Unit (PDU) session impacted by the requested UP path change/(re)selection. Embodiments of the present invention further comprise performing the UP path selection according to the UP path change/(re)selection request. Embodiments of the present invention further comprise transmitting a UP change notification to an application system (AS) controller.

In various embodiments, following the UP path change, the UE may receive information indicative of the new UP path, and may accordingly transmit data using the new UP path which has been established using the approach as described above.

In one embodiment, the UE may be configured to transmit a new session request to a network entity. The UE may further be configured to receive an indication of the completion of a new session setup, for example as received from the CP as described above. The new session setup may be established as described above, for example using the procedure described with respect to FIGS. 10A to 10D.

In more detail, embodiments of the present invention provide for a method for operating a UE in a communications network. The method comprises transmitting a new session request to a network entity. The method further comprises receiving an indication of completion of a new session setup performed in response to the new session request. The method further comprises using the new session setup for data transmission. Performing the new session setup comprises notifying network elements of User Plane (UP) changes in the communications network. Performing the new session setup further comprises receiving a UP path change request corresponding to the new session request. Performing the new session setup further comprises identifying a Protocol Data Unit (PDU) session impacted by the requested UP path change. Performing the new session setup further comprises performing UP path selection according to the UP path change request; and. Performing the new session setup further comprises transmitting a UP change notification to an Application System controller.

Two scenarios for maintaining SSC when UP path reselection occurs are described below.

In a first scenario, the network takes care of the traffic migration, redirection, steering and SSC is maintained without UE being involved. In this case, the SSC handling takes place at RAN, CORE, and or the AS network.

In a second scenario, the UE is involved in the SSC maintenance. Assume the UE starts multiple application sessions (e.g. TCP sessions) with the application, and these application sessions by default use the same UP path (equivalently PDU session). In SSC mode 2, the UE is requested to redirect traffic of all the application sessions on the existing UP path to a new UP path; in SSC mode 3, UE is requested to use a new UP path for new application session traffic, while ongoing application sessions keep using the current UP path. This is performed by the control plane (e.g. the session management function) ending a traffic redirection request (or new session request in the call flow in the invention) to the UE. The request instructs the UE to redirect all traffic (SSC mode 2) or only new traffic (SSC mode 3). Upon this request, the UE sends a session request to trigger session setup. At the end of the session setup, the network informs the UE about the session setup complete, and the UE is then able to perform the traffic redirection as required.

In the given call flow as described above, the UP path change (setup) notification procedure and the traffic steering configuration procedure take place at the end of session setup (before the session setup complete message is transmitted). In other embodiments, the two procedures may occur after session setup, i.e. after the session setup complete message is transmitted to the UE.

The given call flows as described above also show a UP path selection case. In particular the UP path is selected as part of normal session setup (as opposed to upon a UP path reselection trigger). In the UP path selection case, the "traffic redirection request" from the network to the UE does not occur, and UE sends a new session setup request spontaneously. However, the UP path change (setup) notification procedure and the traffic steering configuration procedure may still take place at the end of session setup or after the session setup.

Figure 11:
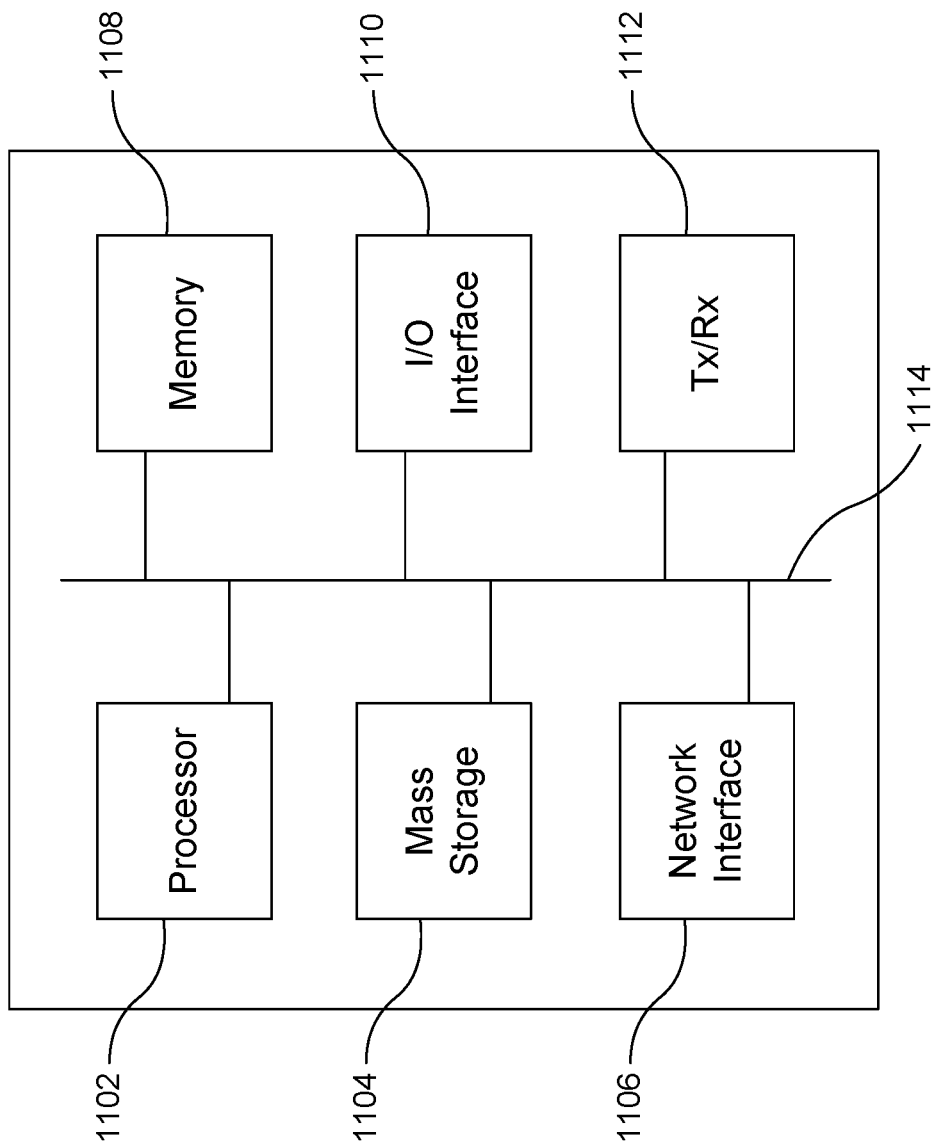
FIG. 11 is a schematic diagram of a hardware device, according to an embodiment.

FIG. 11 is a schematic diagram of a hardware device that may for example, comprise nodes or functional entities of the communications system, or perform any or all of steps of the above methods and features described herein, according to different embodiments of the present invention. As shown, the device includes a processor 1102, memory 1108, non-transitory mass storage 1104, I/O interface 1110, network interface 1106, and a transceiver 1112, all of which are communicatively coupled via bi-directional bus 1114. According to certain embodiments, any or all of the depicted elements may be utilized, or only a subset of the elements. Further, device may contain multiple instances of certain elements, such as multiple processors, memories, or transceivers. Also, elements of the hardware device may be directly coupled to other elements without the bi-directional bus.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage may have recorded thereon statements and instructions executable by the processor for performing any of the aforementioned method steps described above.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

It is readily understood that the terms i.e. (id est) and e.g. (exempli gratia) and for example, are interchangeable and are used to defined examples within the context of which they are used. Moreover, the use of i.e. and e.g. and for example, is not to be interpreted as limiting in any way.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for notifying a network function of a user plane (UP) path change in a communications network, the method comprising:
    transmitting, by the network function to a policy control function (PCF) via a network capability exposure function (NCEF), a request for a notification, the request comprising a duration or time interval indicating when the notification is to be generated, the notification indicative of the UP path change;
    according to the request, enforcing, by the PCF, a session management function (SMF) to send the notification by sending a configuration specifying how to generate the notification to the SMF;
    generating, by the SMF, the notification according to the configuration; and
    sending, by the SMF to the network function via the NCEF, the notification,
    wherein the UP path change is a result of a UP path reselection performed by the SMF.

2. The method according to claim 1, wherein the UP path change is a UP gateway change.

3. The method according to claim 1, wherein the request further comprises information indicating to which UE that the requested notification refers.

4. The method according to claim 1, wherein the NCEF is configured to provide authorised and secure access to capabilities of the communications network and execution of an exposed service.

5. A communication system comprising:
    a network function configured to: transmit, to a policy control function (PCF) via a network capability exposure function (NCEF), a request for a notification of a user plane (UP) path change, the request comprising a duration or time interval indicating when the notification is to be generated, the notification indicative of the UP path change; and
    the PCF configured to: according to the request, enforce a session management function (SMF) to send the notification by sending a configuration specifying how to generate the notification to the SMF;
    the SMF configured to: generate the notification according to the configuration, and send the notification to the network function via the NCEF;
    wherein the UP path change is a result of a UP path reselection.

6. The communication system according to claim 5, wherein the UP path change is a UP gateway change.

7. The communication system according to claim 5, wherein the request further comprises information indicating to which UE that the requested notification refers.

8. The communication system according to claim 5, wherein the NCEF is configured to provide authorised and secure access to capabilities of the communications network and execution of an exposed service.

* * * * *